(12) United States Patent
Kim et al.

(10) Patent No.: US 11,870,576 B2
(45) Date of Patent: Jan. 9, 2024

(54) CONTROL OF ERROR CORRECTION DECODER OPERATION AND USAGE IN A RECEIVER DEVICE

(71) Applicant: QUALCOMM Incorporated, San Diego, CA (US)

(72) Inventors: Hobin Kim, San Diego, CA (US); Hari Sankar, San Diego, CA (US); Alessandro Risso, San Diego, CA (US); Harsha Acharya, Santa Clara, CA (US); Alexei Yurievitch Gorokhov, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/657,115

(22) Filed: Mar. 29, 2022

(65) Prior Publication Data

US 2023/0318741 A1    Oct. 5, 2023

(51) Int. Cl.
*H04L 1/00* (2006.01)
(52) U.S. Cl.
CPC .......... *H04L 1/0061* (2013.01); *H04L 1/0068* (2013.01)

(58) Field of Classification Search
CPC ............................ H04L 1/0061; H04L 1/0068
See application file for complete search history.

(56) References Cited

U.S. PATENT DOCUMENTS

| | | | |
|---|---|---|---|
| 2013/0080863 A1* | 3/2013 | Hida ................. | H03M 13/3715 714/784 |
| 2020/0091933 A1* | 3/2020 | Tate .................. | H03M 13/2906 |
| 2020/0366317 A1* | 11/2020 | Myung ............. | H03M 13/1125 |

* cited by examiner

*Primary Examiner* — Thien Nguyen
(74) *Attorney, Agent, or Firm* — Loza & Loza LLP

(57) ABSTRACT

An apparatus for wireless communication is provided. The apparatus may be a receiver device that includes an error correction decoder, such as a low-density parity check (LDPC) decoder. The apparatus may achieve power savings and/or operation cycle savings by disabling the error correction decoder in scenarios where bits of a codeword in a signal transmission are received without errors. The apparatus obtains a first set of bits of a codeword, wherein the codeword includes the first set of bits and a second set of bits, and wherein the second set of bits is punctured. The apparatus recovers the second set of bits based on at least the first set of bits and determines whether to operate an error correction decoder based on a result of an error detection operation performed on the codeword using the first set of bits and the second set of bits.

30 Claims, 20 Drawing Sheets

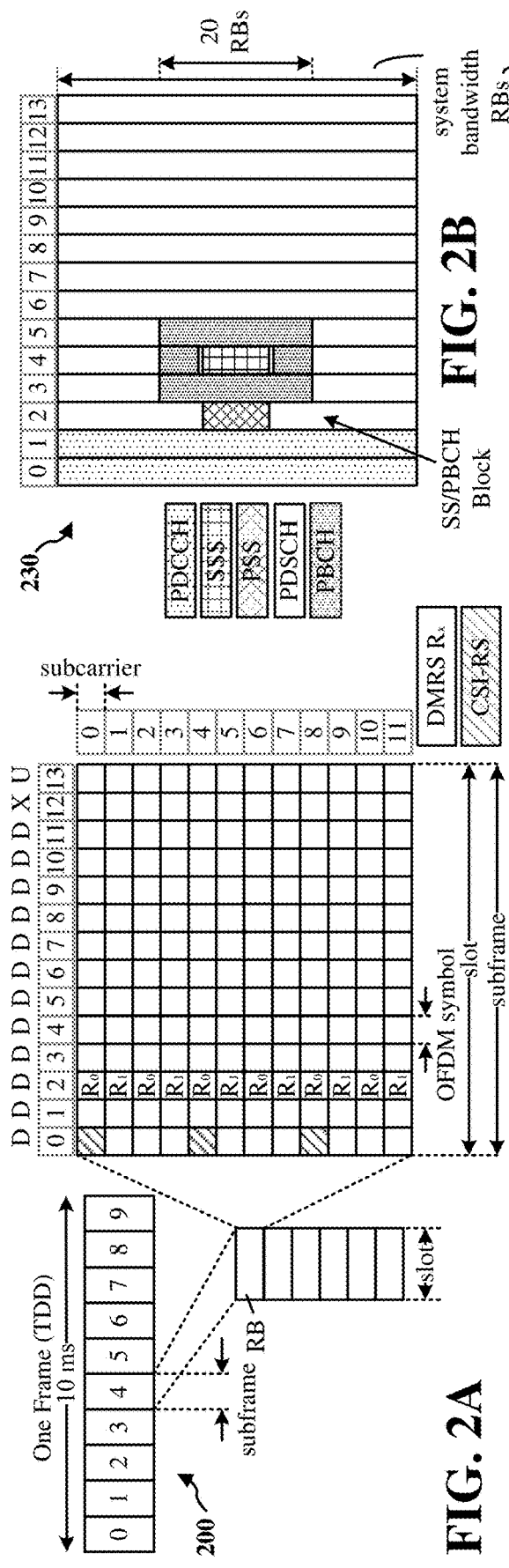
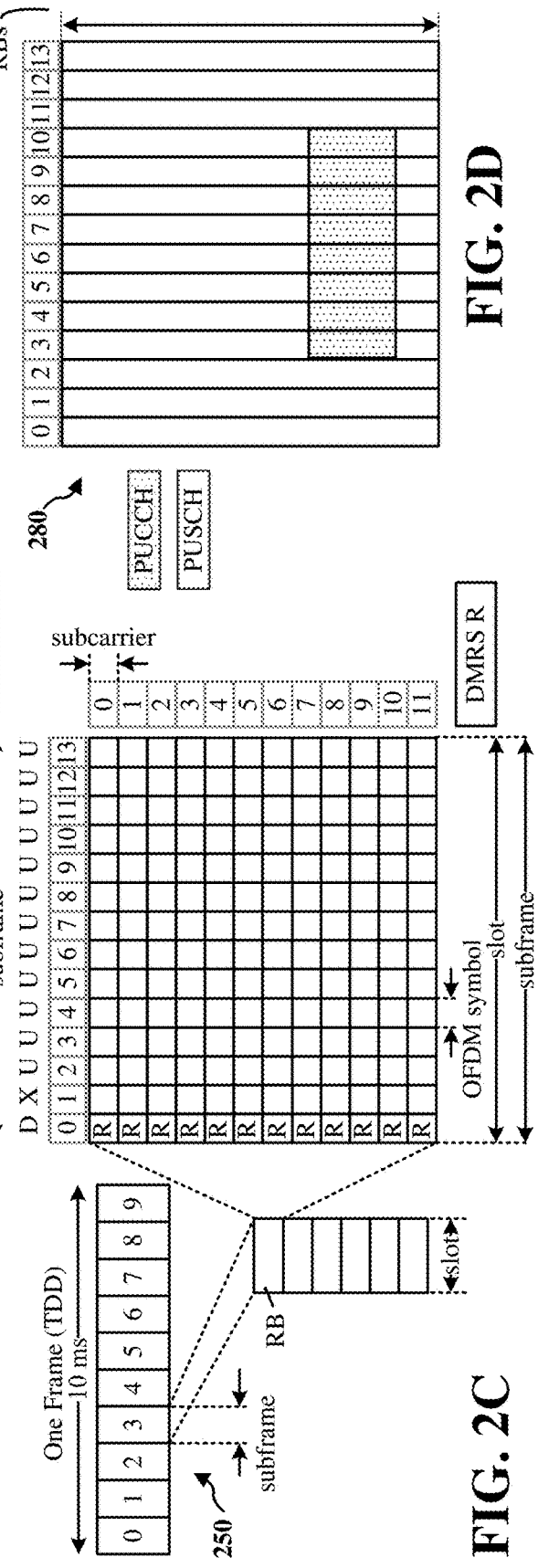
FIG. 2A  FIG. 2B  FIG. 2C  FIG. 2D

CONTROL OF ERROR CORRECTION DECODER OPERATION AND USAGE IN A RECEIVER DEVICE

BACKGROUND

Technical Field

The present disclosure relates generally to communication systems, and more particularly, to the control of error correction decoder operation and usage in a receiver device.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A transmitter device in a wireless communication network (e.g., a 5G NR network) may generate code blocks for transmission to a receiver device (e.g., a user equipment (UE), base station). The transmitter device may apply a channel encoding scheme (e.g., a low-density parity check (LDPC) encoding scheme) to the code blocks to generate channel encoded code blocks (also referred to as codewords). For example, a channel encoded code block may include systematic bits and parity bits. The transmitter device may puncture (e.g., not transmit) some of the systematic bits to improve decoding performance at the receiver device.

The receiver device may use an error correction decoder, such as an LDPC decoder, to perform error correction operations and recovery of the punctured systematic bits. The error correction operations may correct any incorrectly received bits (e.g., due to sign-flipped log likelihood rations (LLRs)). For example, the incorrectly received bits may result from a low signal-to-noise (SNR) ratio, poor channel quality, and/or radio frequency (RF) impairments (e.g., spurs).

When a channel quality of the receiver device is high (e.g., when an SNR value measured at the receiver device is greater than or equal to a threshold), LLR values associated with systematic bits and high-degree parity bits may be accurate (e.g., no sign-flipped LLRs). In the aspects described herein, a receiver device may recover the punctured systematic bits without error correction using LLR values associated with the received systematic bits and parity bits and using a parity check matrix. The receiver device may determine whether to operate an error correction decoder (e.g., an LDPC decoder) based on a result of an error detection operation performed on the systematic bits (including the punctured systematic bits recovered at the receiver device).

In an aspect of the disclosure, a method, a computer-readable medium, and an apparatus are provided. The apparatus may be a receiver device, such as a user equipment (UE), a base station, or other type of receiver device. The apparatus obtains a first set of bits of a codeword, wherein the codeword includes the first set of bits and a second set of bits, wherein the second set of bits is punctured, recovers the second set of bits based on at least the first set of bits, and determines whether to operate an error correction decoder based on a result of an error detection operation performed on the codeword using the first set of bits and the second set of bits.

In an aspect of the disclosure, a method, a computer-readable medium, and an apparatus are provided. The apparatus may be a receiver device, such as a user equipment (UE), a base station, or other type of receiver device. The apparatus obtains a plurality of bits of a codeword, performs an error detection operation on the plurality of bits of the codeword, and disables an error correction decoder when a result of the error detection operation indicates no errors in the plurality of bits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 7A, 7B, 7C, and 7D illustrate an example of a parity check matrix used for channel encoding of one or more code blocks.

DETAILED DESCRIPTION

Figure 1:
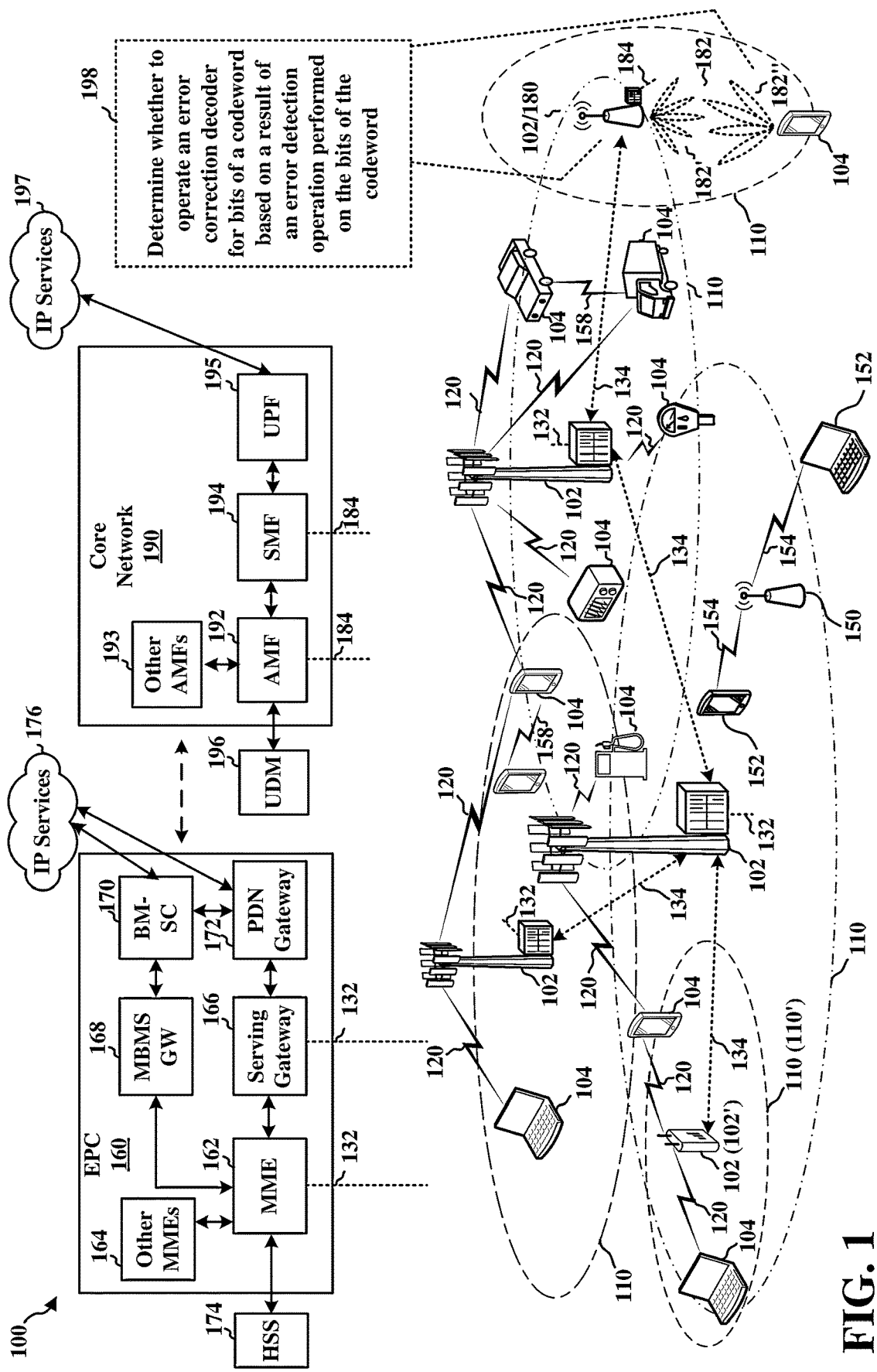
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiver (e.g., the UE 104 or the base station 102) may be configured to determine whether to operate an error correction decoder for bits of a codeword based on a result of an error detection operation performed on the bits of the codeword (198). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
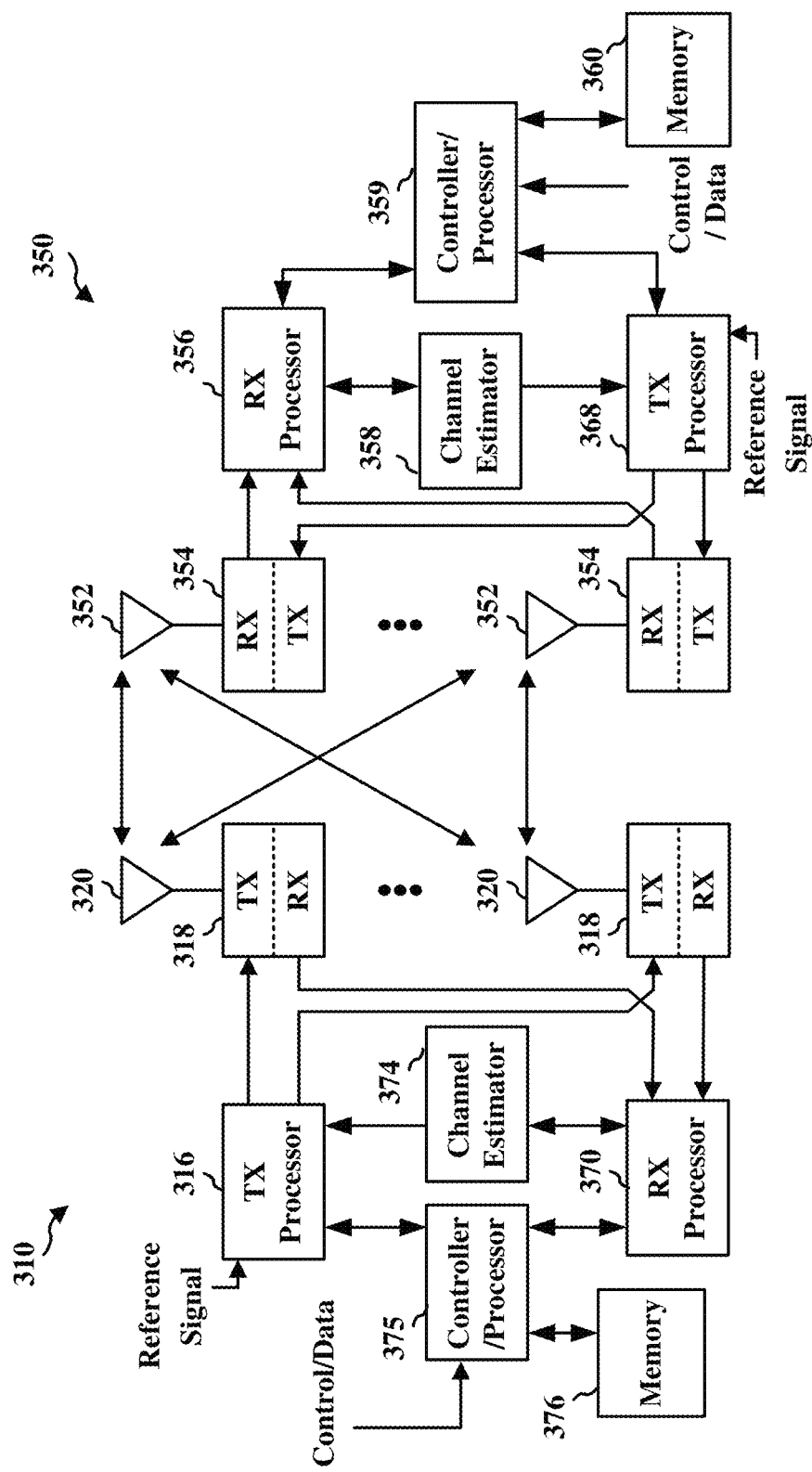
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, if the UE 104 is implemented as a receiver device, at least one of the TX processor 368, the RX processor 356, and the controller/processor 359 may be configured to perform aspects in connection with 198 of FIG. 1. In some aspects, if the base station 102 is implemented as a receiver device, at least one of the TX processor 316, the RX processor 370, and the controller/processor 375 may be configured to perform aspects in connection with 198 of FIG. 1.

Figure 4:
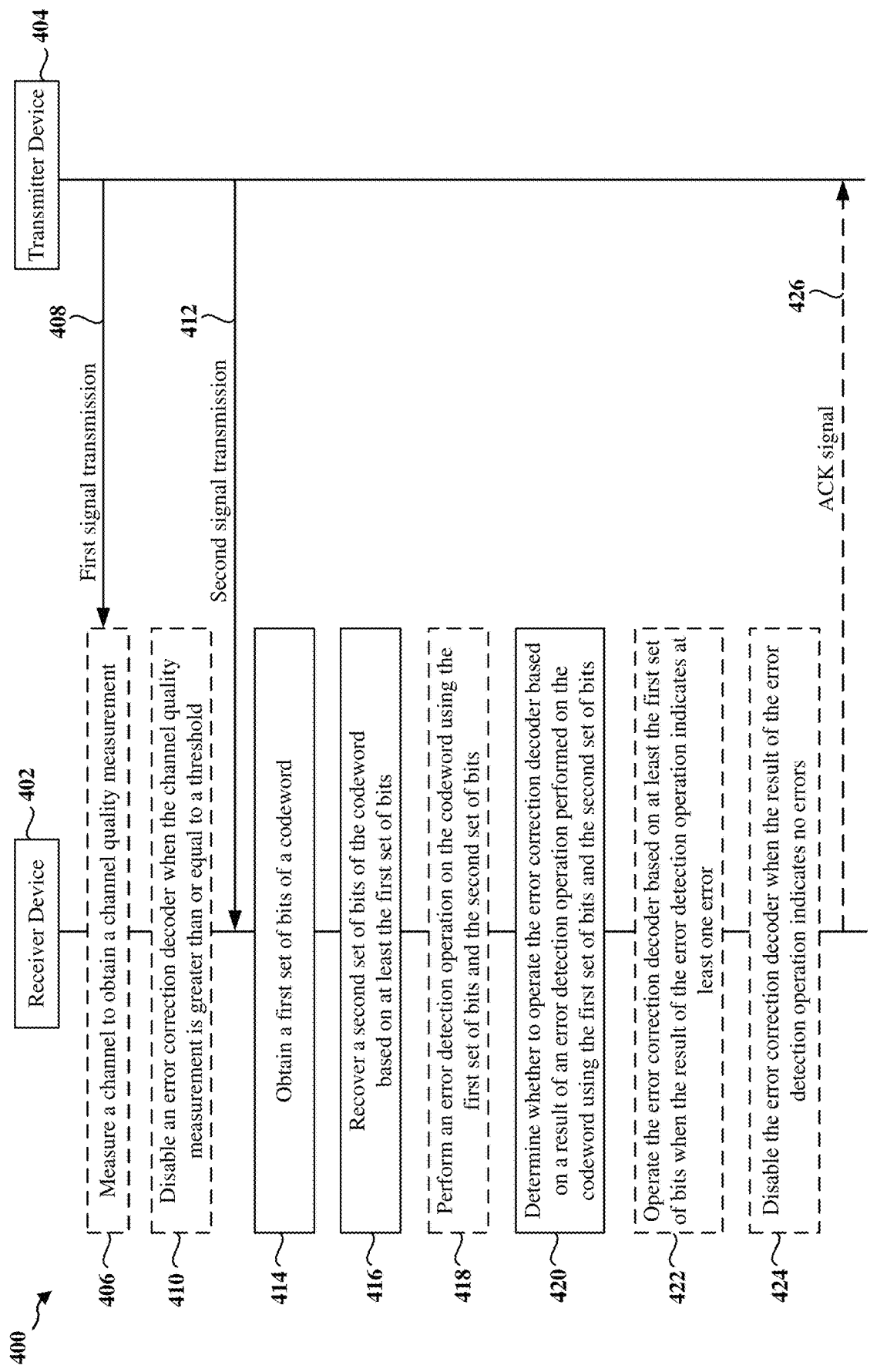
FIG. 4 illustrates a signal flow diagram in accordance with various aspects of the disclosure.

FIG. 4 illustrates a signal flow diagram 400 in accordance with various aspects of the disclosure. The signal flow diagram 400 includes a receiver device 402 and a transmitter device 404. In some examples, the receiver device 402 may be a UE (e.g., UE 104), a base station (e.g., base station 102), or other network entity capable of receiving a signal transmission. In some examples, the transmitter device 404 may be a UE (e.g., UE 104), a base station (e.g., base station 102), or other network entity capable of transmitting a signal transmission.

At 406, the receiver device 402 may optionally measure a wireless communication channel (also referred to as a channel) to obtain a channel quality measurement. For example, the transmitter device 404 may transmit a first signal transmission 408 and the receiver device 402 may measure the first signal transmission 408. For example, the first signal transmission 408 may include a reference signal (e.g., a CSI-RS or an SRS). In some examples, a measurement of the first signal transmission 408 at the receiver device 402 may be a channel quality measurement, such as a received signal strength value (e.g., a reference signal received power (RSRP) value), a signal-to-noise ratio (SNR) value, and/or a signal-to-interference plus noise ratio (SINR) value. In other examples, the receiver device 402 may measure the channel in terms of a quality of one or more log likelihood ratios (LLRs). In some examples, the channel quality measurement at the receiver device 402 may be expressed as a combination of a received signal strength value, an SNR value, an SINR value, and/or a quality of one or more LLRs.

Figure 9:
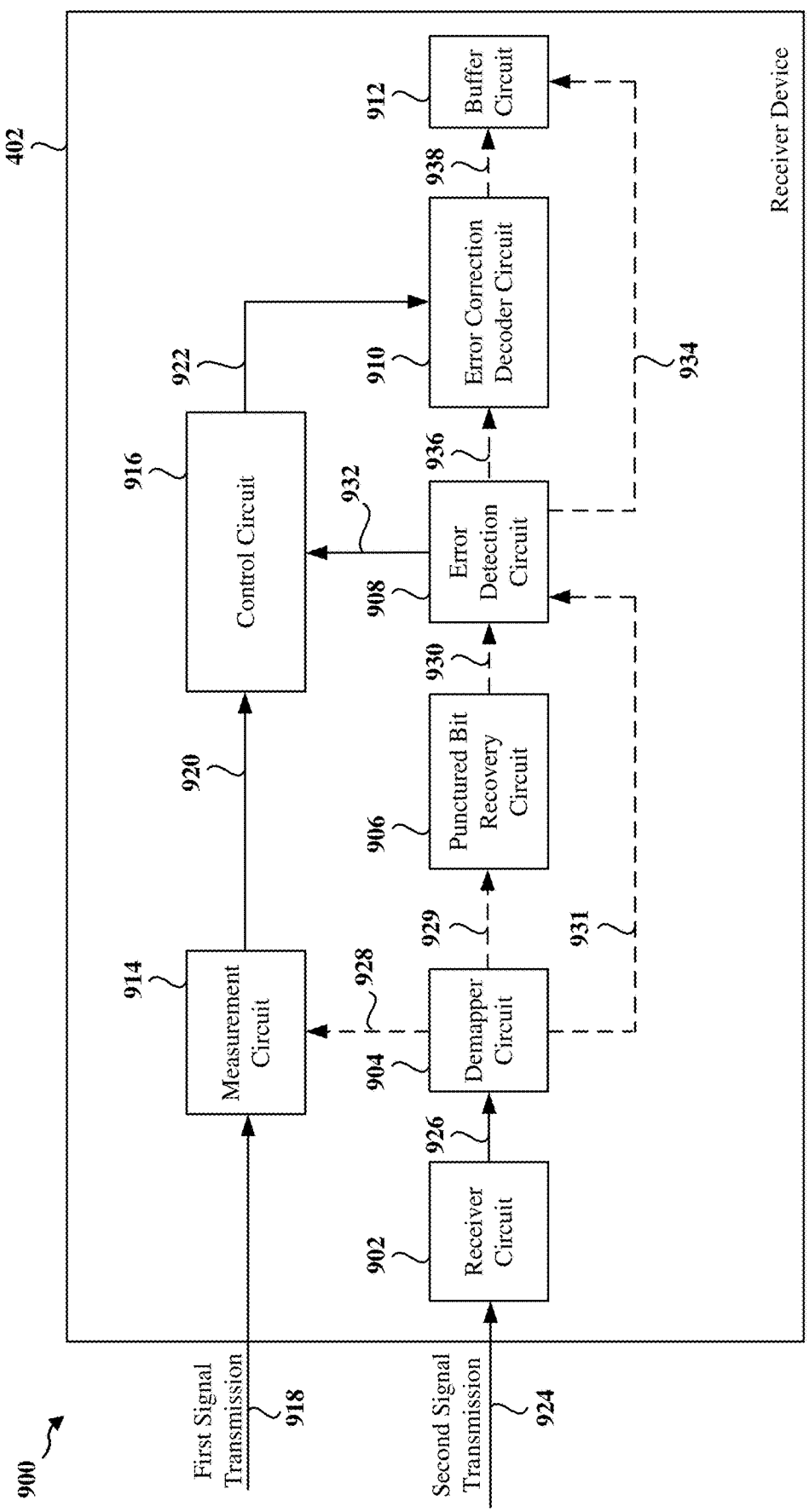
FIG. 9 is a diagram of the receiver device in accordance with various aspects of the disclosure.
Figure 10:
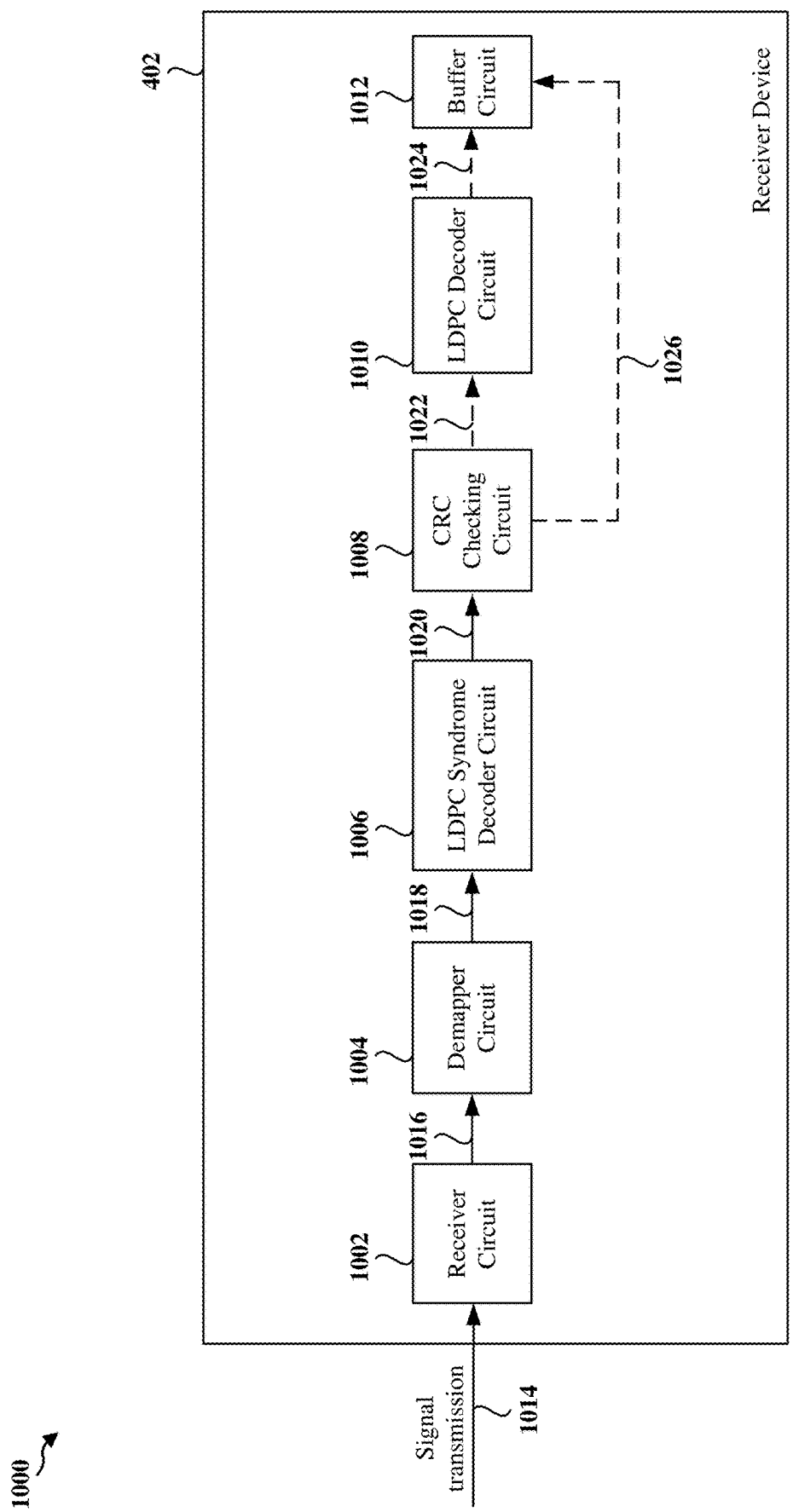
FIG. 10 is a diagram of the receiver device in accordance with various aspects of the disclosure.

At 410, the receiver device 402 may optionally disable an error correction decoder of the receiver device 402 (e.g., the error correction decoder circuit 910 in FIG. 9 or the low-density parity check (LDPC) decoder circuit 1010 in FIG. 10) when the channel quality measurement is greater than or equal to a threshold. For example, the error correction decoder of the receiver device 402 may be an LDPC decoder circuit, a polar code decoder circuit, or other type of decoder circuit for decoding a channel encoded transmission.

In some examples, the receiver device 402 may disable the error correction decoder of the receiver device 402 by powering off the error correction decoder, powering off one or more hardware components associated with the error correction decoder, avoiding usage of the error correction decoder, and/or or preventing operation of the error correction decoder. Such disabling of the error correction decoder may reduce power consumption at the receiver device 402, thereby resulting in power savings.

The transmitter device 404 may transmit a second signal transmission 412 carrying information bits (e.g., data bits and/or control information bits) to the receiver device 402. In some examples, the information bits may be in the form of a code block as described herein. In some examples, error detection bits associated with the information bits may be included in a code block. For example, the error detection bits may include cyclic-redundancy check (CRC) bits.

The transmitter device 404 may encode one or more code blocks using a channel encoding scheme, such as a low-density parity check (LDPC) encoding scheme, to generate one or more channel encoded code blocks. The channel encoding scheme may provide error correction bits (e.g., parity bits) for the code blocks. An example structure of a code block and error correction bits is described with reference to FIG. 5.

A channel encoded code block may include a code block and error correction bits associated with the code block. As described herein, one or more channel encoded code blocks may be referred to as a codeword. In some examples, the transmitter device 404 may include one or more channel encoded code blocks (e.g., a codeword) in the second signal transmission 412.

Figure 5:
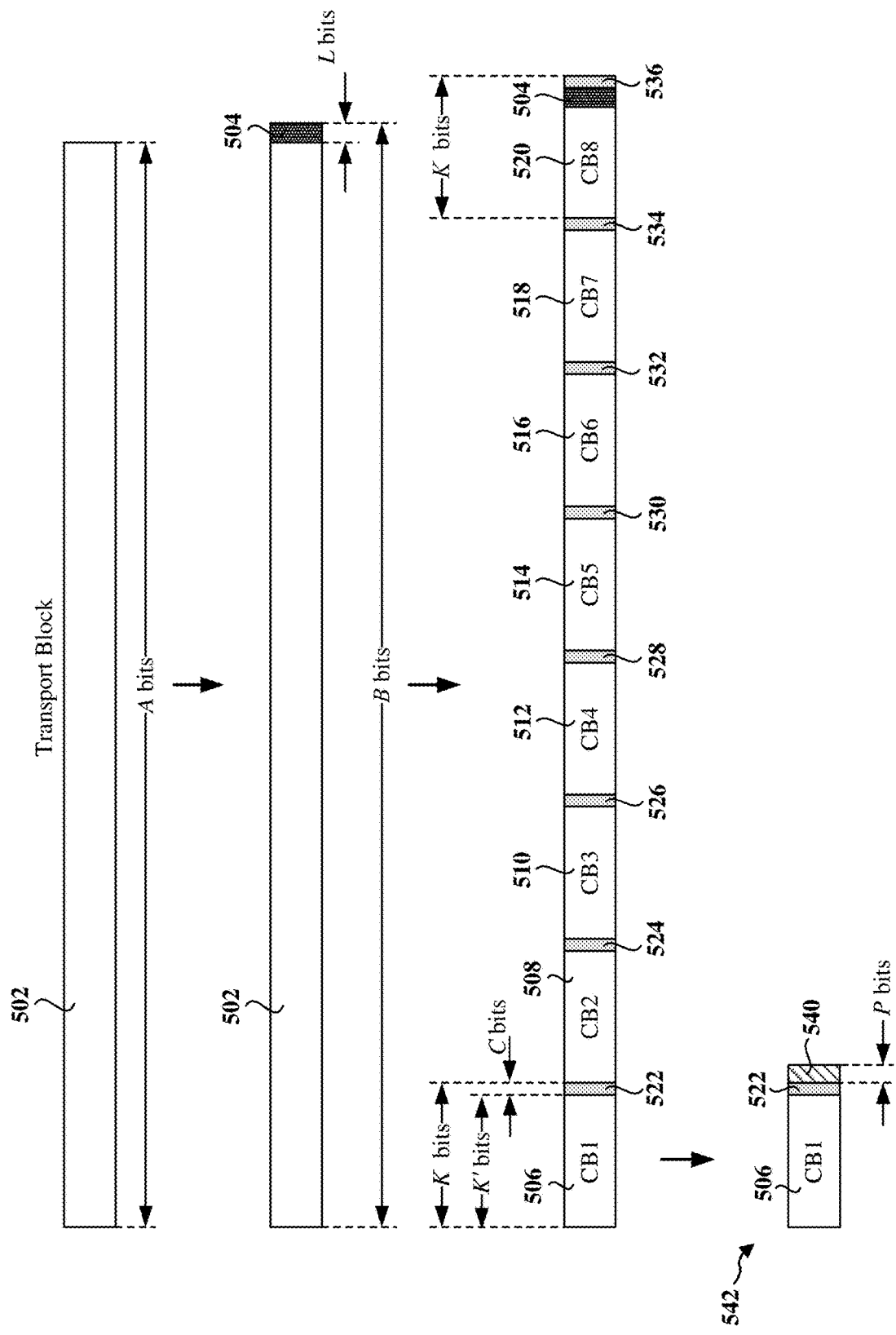
FIG. 5 illustrates an example of a transport block.

FIG. 5 illustrates an example of a transport block 502. The transport block 502 may include information bits and may have a size of A bits, where A represents a positive integer. The transmitter device 404 may attach error detection bits 504 to the transport block 502. For example, the error detection bits 504 may be CRC bits and may have a size of L bits, where L represents a positive integer. The transport block 502 with the error detection bits 504 may have a total size of B bits, where B=A+L.

In scenarios where B is greater than a threshold value (e.g., a maximum code block size of 8448 bits), the transmitter device 404 may segment the transport block 502 with the error detection bits 504 into multiple code blocks (CBs). For example, as shown in FIG. 5, the transport block 502 with the error detection bits 504 may be segmented into code block 1 (CB1) 506, code block 2 (CB2) 508, code block 3 (CB3) 510, code block 4 (CB4) 512, code block 5 (CB5) 514, code block 6 (CB6) 516, code block 7 (CB7) 518, and code block 8 (CB8) 520. The transmitter device 404 may attach error detection bits to each of the code blocks, such as the error detection bits 522, 524, 526, 528, 530, 532, 534, 536.

For example, each of the code blocks 506, 508, 510, 512, 514, 516, 518, may have a size of K' bits, where K' represents a positive integer. In some examples, K' may be equal to 8424. The final code block (e.g., the code block 8

(CB8) 520) may have a size that is less than or equal to K'. For example, each of the error detection bits 522, 524, 526, 528, 530, 532, 534, 536 may have a size of C bits, where C represents a positive integer. In some examples, C may be equal to 24. Each of the code blocks 506, 508, 510, 512, 514, 516, 518, 520 and any corresponding error detection bits may have a total size of K bits. In some examples, K=K'+C. For example, K may be equal to 8448.

The transmitter device 404 may individually channel encode each of the code blocks 506, 508, 510, 512, 514, 516, 518, and 520 to generate channel encoded code blocks. As previously described, a channel encoded code block or a group of channel encoded code blocks may be referred to as a codeword. For example, the transmitter device 404 may apply an LDPC channel encoding scheme to channel encode each of the code blocks 506, 508, 510, 512, 514, 516, 518, and 520. In one example, the transmitter device 404 may channel encode the code block 1 (CB1) 506 and the error detection bits 522 of the code block 1 (CB1) 506 using the LDPC channel encoding scheme to generate parity bits 540. For example, the parity bits 540 may have a size of P bits, where P represents a positive integer. The transmitter device 404 may add the parity bits 540 to the code block 1 (CB1) 506 to form a codeword 542 as shown in FIG. 5.

Figure 6:
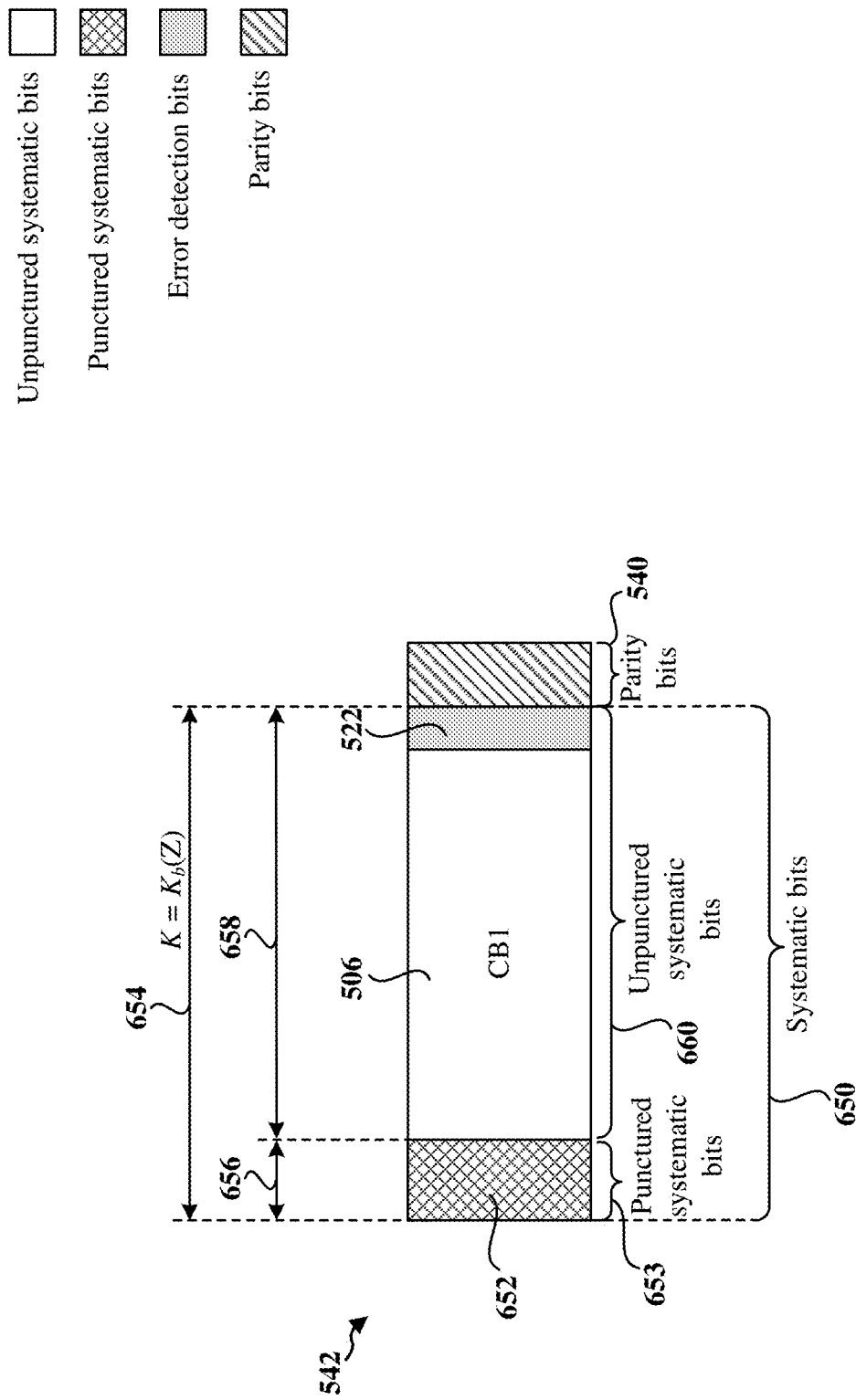
FIG. 6 illustrates systematic bits, parity bits, and punctured systematic bits of the codeword.

FIG. 6 illustrates systematic bits, parity bits, and punctured systematic bits of the codeword 542. For example, the codeword 542 may include systematic bits 650 and the parity bits 540. The systematic bits 650 may have a size 654 of K systematic bits. In some examples, K=Kb(Z) bits, where Kb represents the number of variable nodes of systematic bits in a parity check matrix used for channel encoding (e.g., LDPC encoding) and Z represents a lifting size. In some examples, Z may be less than or equal to 384. In one example, Kb=22, in which case K=22(Z).

The transmitter device 404 may puncture a portion 652 of the systematic bits 650. In other words, the transmitter device 404 may not transmit the portion 652 of the systematic bits 650 to the receiver device 402. The portion 652 of the systematic bits 650 are herein referred to as punctured systematic bits 653 and the remaining portion of the systematic bits 650 are herein referred to as unpunctured systematic bits 660.

Considering an example where Kb=22 and K=22(Z), the size 656 of the punctured systematic bits 653 may be 2(Z) bits and the size 658 of the unpunctured systematic bits 660 may be 20(Z) bits. Therefore, the transmitter device 404 may not transit the first 2(Z) systematic bits the of the systematic bits 650 and may transmit the remaining 20(Z) systematic bits of the systematic bits 650. This is further described with reference to FIGS. 7A, 7B, 7C, and 7D.

FIGS. 7A, 7B, 7C, and 7D illustrate an example of a parity check matrix 700 used for channel encoding (e.g., LDPC encoding) of one or more code blocks. In the parity check matrix 700, each row may represent a check node and each column may represent a variable node. For example, the parity check matrix 700 includes twelve check nodes 704 and 34 variable nodes 702. It should be understood that the parity check matrix 700 described herein represents one example and that other parity matrices of different sizes (e.g., a different number of rows and/or a different number of columns) may be implemented in other examples.

A first portion of the variable nodes 702 (e.g., systematic variable nodes 706) may be associated with systematic bits of a codeword and a second portion of the variable nodes 702 (e.g., parity variable nodes 708) may be associated with parity bits of the codeword. In some examples, the variable nodes 702 may be in the form of soft-decision values (e.g., LLR values) or hard-decision values (e.g., binary values).

Each of the variable nodes 702 may be associated with Z bits of a codeword (e.g., the codeword 542). An entry set to "1" in the parity check matrix 700 may be associated with a different Z×Z circulant permutation matrix, while an entry set to "0" in the parity check matrix 700 may be associated with a Z×Z identity matrix. Moreover, an entry set to "1" may represent a connection (also referred to as an edge) between a variable node and a check node.

Figure 7A:
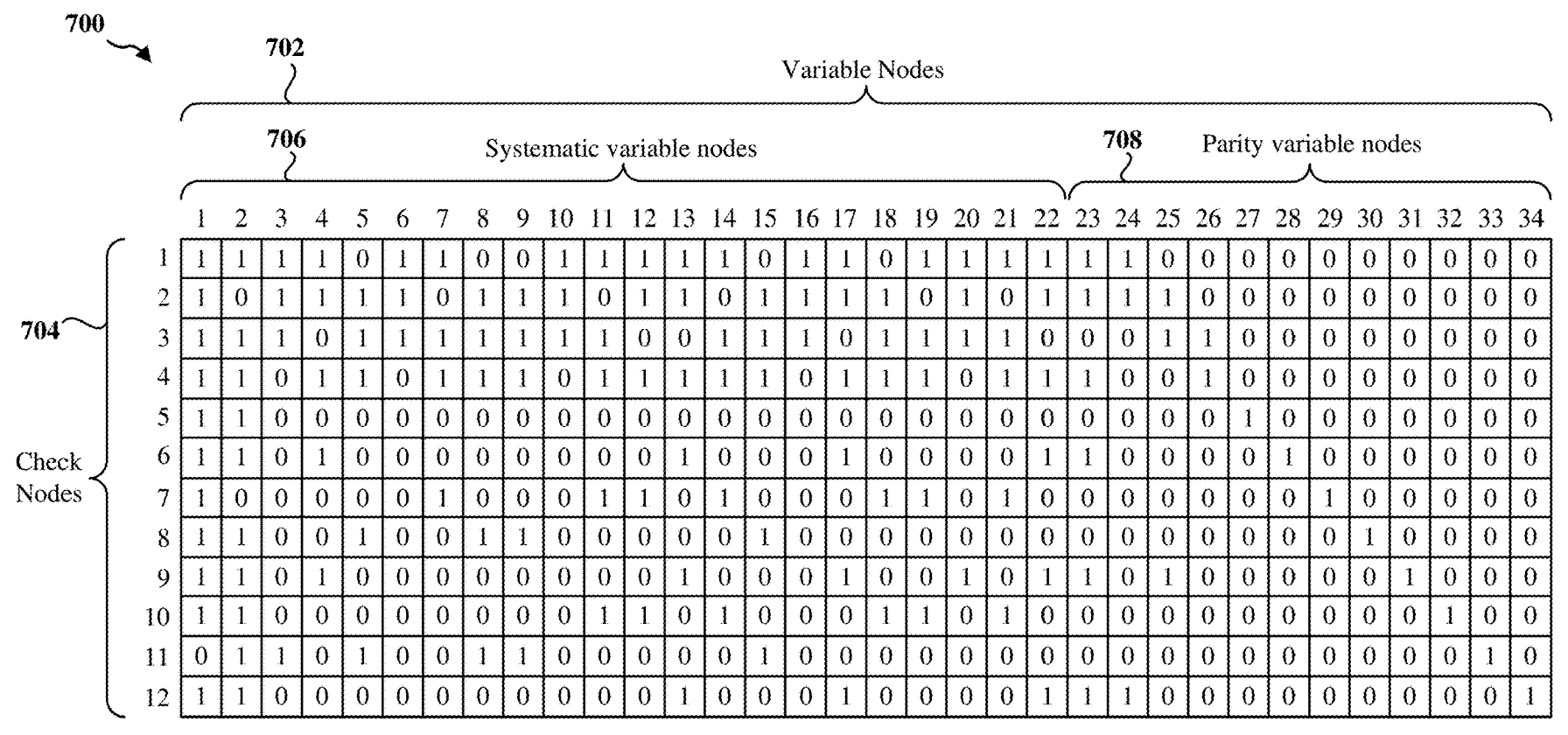
Figure 7B:
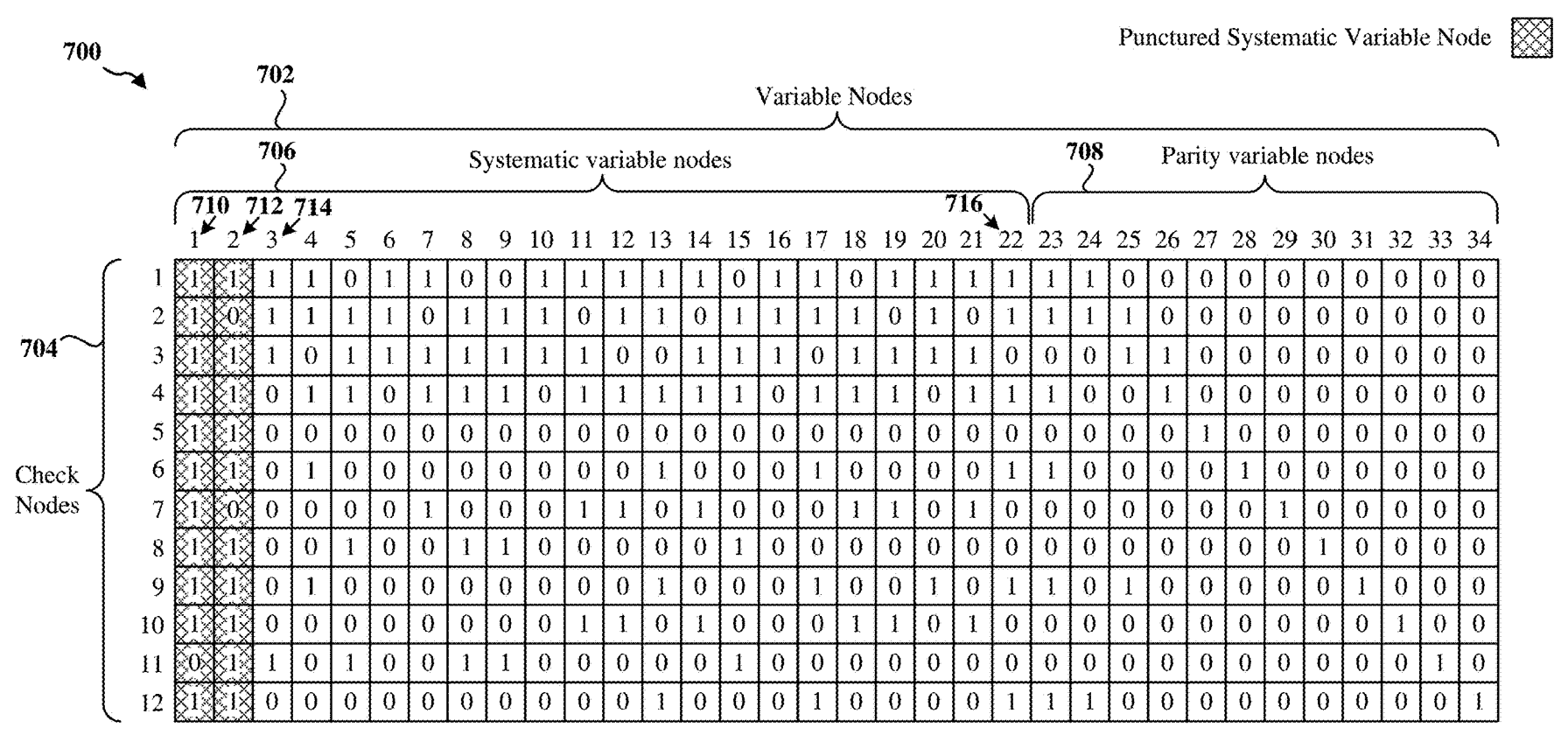

One or more of the systematic variable nodes 706 may be punctured as shown in FIG. 7B. In the example of FIG. 7B, the first two of the systematic variable nodes 706 (e.g., the first and second systematic variable nodes 710, 712 of the systematic variable nodes 706) are punctured, which means that the transmitter device 404 may not transmit the first 2(Z) systematic bits of a codeword. For example, with reference to FIG. 6, if the size 656 of the punctured systematic bits 653 is 2(Z) bits, the transmitter device 404 may not transmit the first 2(Z) systematic bits of the codeword 542.

Referring back to FIG. 4, at 414, the receiver device 402 obtains a first set of bits of the codeword included in the second signal transmission 412. In one example, the first set of bits may be the unpunctured systematic bits of a channel encoded code block (e.g., a codeword). For example, with reference to FIG. 6, the first set of bits may include at least the unpunctured systematic bits 660 having a size 658 of the codeword 542.

In some examples, the first set of bits of the codeword 542 included in the second signal transmission 412 may include the unpunctured systematic bits 660 and the parity bits 540. The unpunctured systematic bits 660 may be associated with the systematic variable nodes 706 in the parity check matrix 700. For example, the first set of bits may include 20(Z) bits associated with 20 of the systematic variable nodes 706 (e.g., from variable node_3 714 to the variable node_22 716 as shown in FIG. 7B).

In some examples, the receiver device 402 may obtain the first set of bits of the codeword 542 by demodulating the second signal transmission 412 carrying the codeword 542 to generate soft-decision values. For example, the soft-decision values may be in the form of log likelihood ratio (LLR) values (also referred to as LLRs). The receiver device 402 may then use the soft-decision values to determine hard-decision bits (e.g., binary values) of the codeword 542.

At 416, the receiver device 402 may recover a second set of bits of the codeword 542 based on at least the first set of bits. For example, the second set of bits may include punctured systematic bits, such as the punctured systematic bits 653 of the codeword 542 shown in FIG. 6. In some examples, the first set of bits may include at least a first information bit and at least one parity bit. For example, the first information bit may be a first data bit or a first control information bit. In some examples, the second set of bits may include at least a second information bit. For example, the second information bit may be a second data bit or a second control information bit.

In some examples, the receiver device 402 may recover the second set of bits of the codeword 542 by performing a syndrome decoding operation based on the first set of bits, a parity check matrix (also referred to as a parity matrix) associated with the codeword 542, and a syndrome defined as a zero vector. For example, the syndrome of a set of bits may be determined using the following equation:

$$s = H(y^T)$$ (equation 1)

where s is a vector representing the syndrome of $y^T$, H represents a parity check matrix, and $y^T$ represents a vector including the set of bits. For example, the syndrome s may be a zero vector (e.g., a vector that does not include any non-zero values) if the set of bits includes no errors.

In some examples, the syndrome decoding operation includes an exclusive OR operation between two or more subsets of bits in the first set of bits. Each of the subsets of bits may be associated with a different variable node of a same check node in a parity check matrix. This is described in detail with reference to the parity check matrix 700 in FIG. 7C.

Figure 7C:
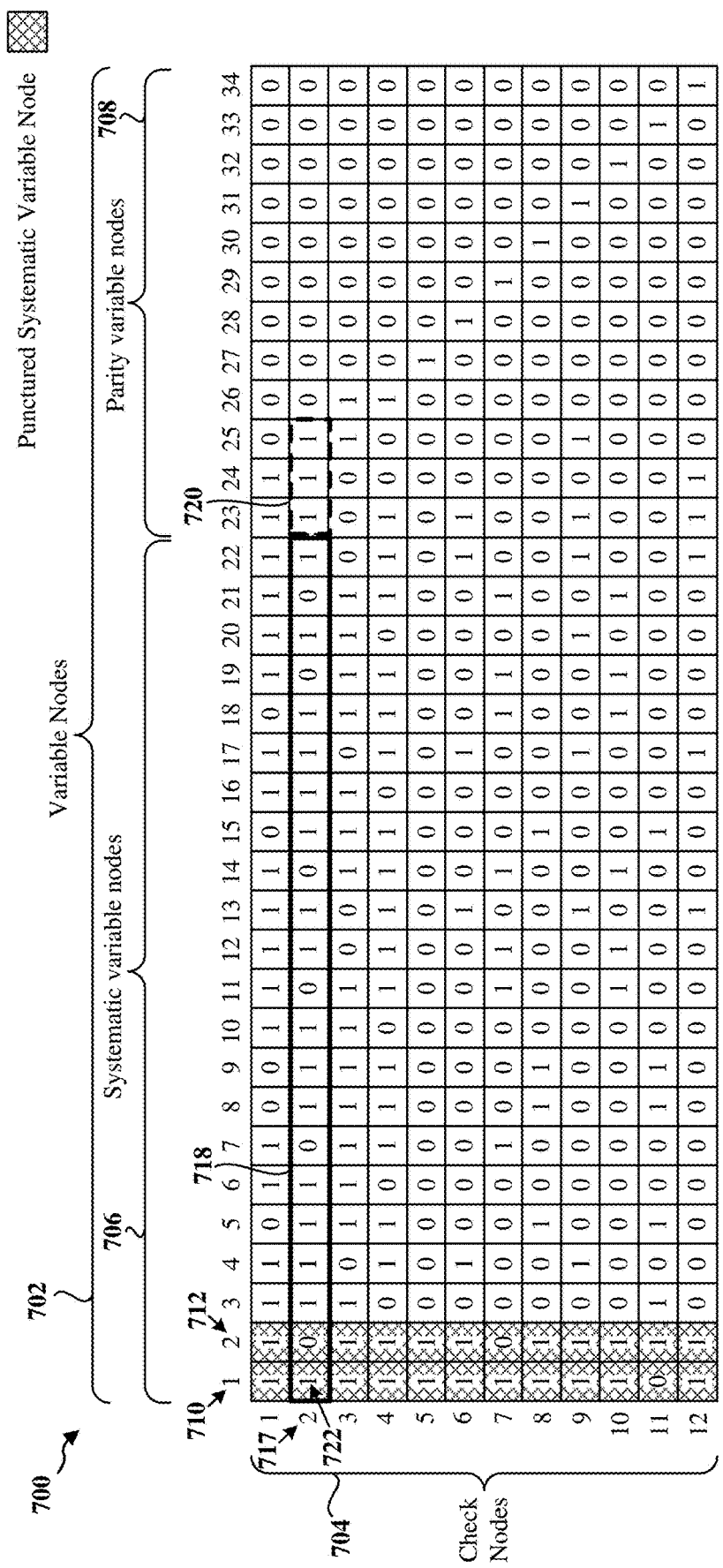

For example, with reference to FIG. 7C, the receiver device 402 may select a check node in the parity check matrix 700 that includes a systematic variable node having punctured systematic bits and an entry in the parity check matrix 700 set to "1" for that systematic variable node. In one example, the receiver device 402 may select the second check node 717 that includes the systematic variable nodes 718 and the parity variable nodes 720. The first systematic variable node 710 of the second check node 717 includes punctured systematic bits and an entry 722 in the parity check matrix 700 set to "1".

The receiver device 402 may perform an exclusive OR operation (also referred to as an XOR operation) between each set of Z bits associated with the systematic variable nodes 718 and the parity variable nodes 708 having an entry set to "1" at the second check node 717. Therefore, in the example of FIG. 7C, the receiver device 402 may perform an exclusive OR operation between the Z bits of the variable nodes 3, 4, 5, 6, 8, 9, 10, 12, 13, 15, 16, 17, 18, 20, 22, 23, 24, 25. The exclusive OR operation between the Z bits of the variable nodes 3, 4, 5, 6, 8, 9, 10, 12, 13, 15, 16, 17, 18, 20, 22, 23, 24, 25 may be performed in a bitwise manner.

The result of the exclusive OR operation between each set of Z bits associated with the systematic variable nodes 718 and the parity variable nodes 708 having an entry set to "1" at the second check node 717 may represent Z bits (e.g., Z punctured systematic bits) associated with the first systematic variable node 710. Therefore, the receiver device 402 may recover the punctured systematic bits associated with the first systematic variable node 710 by performing the exclusive OR operation between the Z bits of the variable nodes 3, 4, 5, 6, 8, 9, 10, 12, 13, 15, 16, 17, 18, 20, 22, 23, 24, 25.

Figure 7D:
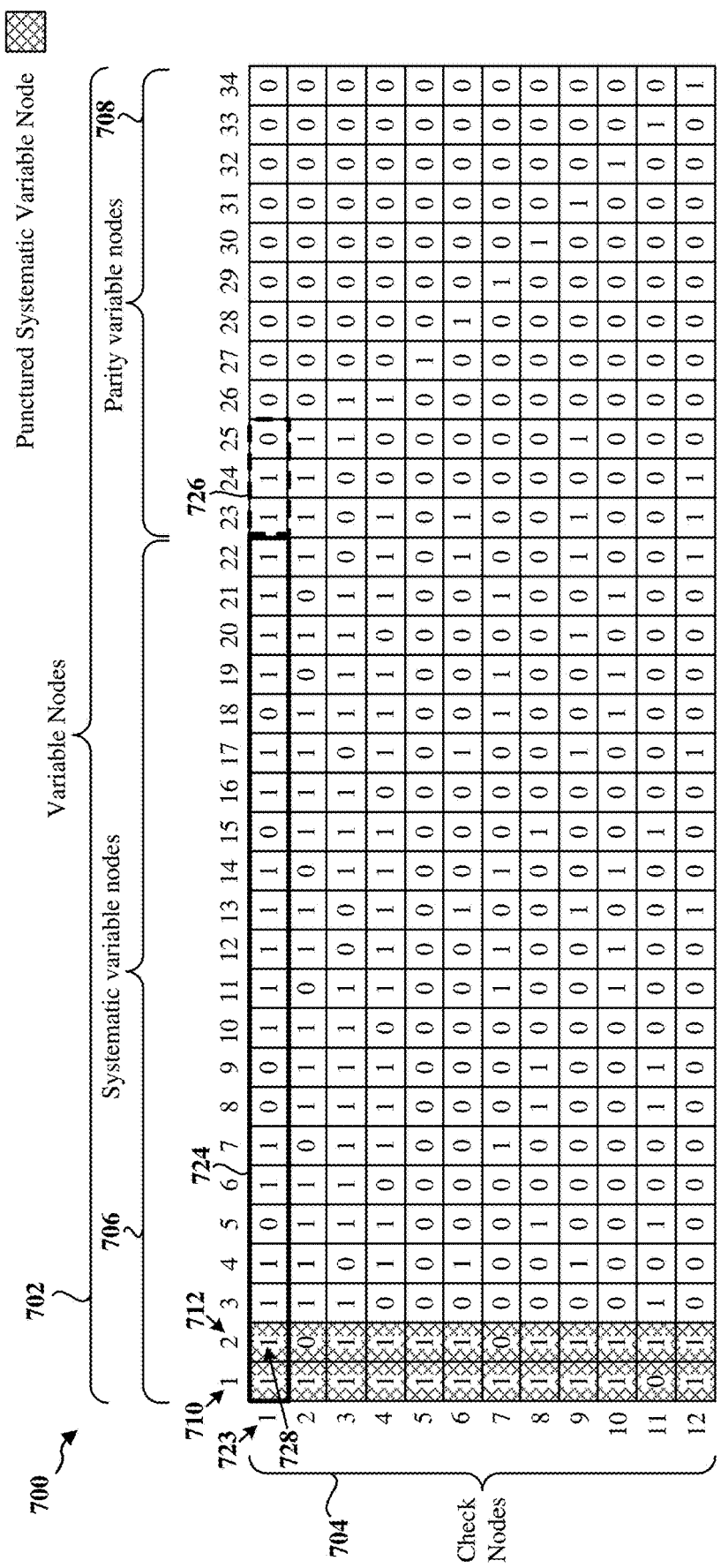

With reference to FIG. 7D, the receiver device 402 may select the first check node 723 that includes the systematic variable nodes 724 and the parity variable nodes 726. The second systematic variable node 712 of the first check node 723 includes punctured systematic bits and an entry 728 in the parity check matrix 700 set to "1".

The receiver device 402 may perform an exclusive OR operation between each set of Z bits associated with the systematic variable nodes 724 and parity variable nodes 726 having an entry set to "1" at the first check node 723. Therefore, in the example of FIG. 7D, the receiver device 402 may perform an exclusive OR operation between the Z bits of the variable nodes 1, 3, 4, 6, 7, 10, 11, 12, 13, 14, 16, 17, 19, 20, 21, 22, 23, 24. The exclusive OR operation between the Z bits of the variable nodes 1, 3, 4, 6, 7, 10, 11, 12, 13, 14, 16, 17, 19, 20, 21, 22, 23, 24 may be performed in a bitwise manner.

The result of the exclusive OR operation between each set of Z bits associated with the systematic variable nodes 724 and parity variable nodes 726 having an entry set to "1" at the first check node 723 may represent Z bits (e.g., Z punctured systematic bits) associated with the second systematic variable node 712. Therefore, in the example of FIG. 7D, the receiver device 402 may recover the punctured systematic bits associated with the second systematic variable node 712 by performing an exclusive OR operation between the Z bits of the variable nodes 1, 3, 4, 6, 7, 10, 11, 12, 13, 14, 16, 17, 19, 20, 21, 22, 23, 24.

In some examples, the receiver device 402 may recover the second set of bits of the codeword 542 by performing a minimum-sum decoding operation (also referred to as a min-sum approximation operation) based on at least the first set of bits and a parity check matrix associated with the codeword 542. For example, the receiver device 402 may perform the minimum-sum decoding operation by performing a check-node update operation using soft-decision bit values associated with one or more of the systematic variable nodes 706 and parity variable nodes 708.

In one example, with reference to FIG. 7C, the receiver device 402 may determine extrinsic values (e.g., LLR values) of the first systematic variable node 710 of the second check node 717 using the following equation:

$$C1 = (\text{sign}(V3)*\text{sign}(V4)* \ldots *\text{sign}(V25)) \times \min(|V3|, |V4|, \ldots, |V25|) \quad \text{(equation 2)}$$

where C1 represents an LLR value of a bit associated with the first systematic variable node 710, the expression (sign(V3)*sign(V4)* ... *sign(V25)) represents the product of the signs of LLR values for corresponding bits associated with the systematic variable nodes 718 and parity variable nodes 720 having an entry set to "1" in the parity check matrix 700 at the second check node 717, and min(|V3|, |V4|, ..., |V25|) represents a min function of LLR values for corresponding bits associated with the systematic variable nodes 718 and parity variable nodes 720 having an entry set to "1" in the parity check matrix 700 at the second check node 717.

Figure 8:
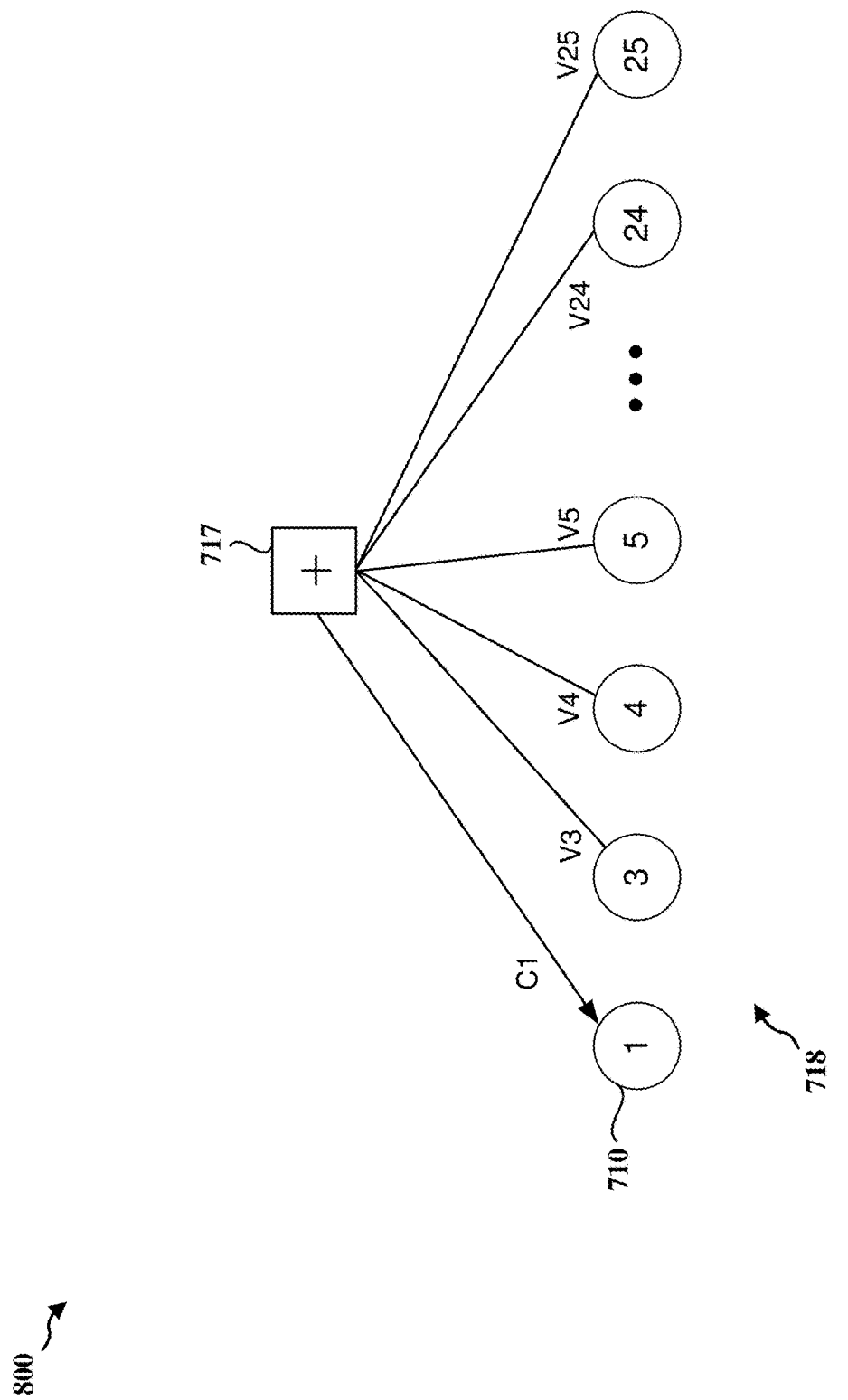
FIG. 8 is a diagram illustrating a check node and systematic variable nodes and parity variable nodes having an entry set to "1" in the parity check matrix at the check node.

FIG. 8 is a diagram 800 illustrating the second check node 717 and the systematic variable nodes 718 and parity variable nodes 720 having an entry set to "1" in the parity check matrix 700 at the second check node 717. In FIG. 8, C1 represents an LLR value of a bit associated with the first systematic variable node 710, and V3, V4, V5 ... V24, V25, represent LLR values for bits associated with the systematic variable nodes 718 and parity variable nodes 720 having an entry set to "1" in the parity check matrix 700 at the second check node 717.

After the receiver device 402 has determined the extrinsic values (e.g., LLR values) of the first systematic variable node 710 of the second check node 717 using equation 2, the receiver device 402 may determine extrinsic values (e.g., LLR values) of the second systematic variable node 712 of the first check node 723 using the following equation:

$$C2 = (\text{sign}(V1)*\text{sign}(V3)* \ldots *\text{sign}(V24)) \times \min(|V1|, |V3|, \ldots, |V24|) \quad \text{(equation 3)}$$

where C2 represents an LLR value of a bit associated with the second systematic variable node 712, the expression (sign(V1)*sign(V3)* ... *sign(V24)) represents the product of the signs of LLR values for corresponding bits associated with the systematic variable nodes 724 and parity variable nodes 726 having an entry set to "1" in the parity check matrix 700 at the first check node 723, and min(|V1|, |V3|, ..., |V24|) represents a min function of LLR values for corresponding bits associated with the systematic variable nodes 724 and parity variable nodes 726 having an entry set to "1" in the parity check matrix 700 at the first check node 723.

The receiver device 402 may determine hard-decision values from LLR values (e.g., C1, C2) to recover the punctured systematic bits associated with the first and second systematic variable nodes 710, 712. The receiver device 402 may perform an error detection operation using the bits associated with each of the systematic variable nodes 706 (e.g., using 22(Z) bits associated with the systematic variable nodes 706). In some examples, the error detection operation may be a CRC check operation (also referred to as a CRC check or a CRC). For example, the receiver device 402 may perform a CRC check operation using 22(Z) bits associated with the systematic variable nodes 706.

In some examples, the receiver device 402 may determine the punctured systematic bits based on the first set of bits (e.g., based on unpunctured systematic bits) without performing an error correction operation when a channel quality measurement is greater than or equal to a threshold. The channel quality measurement may include at least one of a received signal strength value, an SNR value, an SINR value, a quality of one or more LLRs, or a combination thereof.

Referring back to FIG. 4, at 418, the receiver device 402 optionally performs an error detection operation on the codeword using the first set of bits and the second set of bits. In some examples, the error detection operation may include a syndrome checking operation, a CRC check operation (also referred to as a CRC check or a CRC), or a combination thereof.

For example, after the receiver device 402 has recovered the punctured systematic bits associated with the first and second systematic variable nodes 710, 712, the receiver device 402 may perform an error detection operation using the bits associated with each of the systematic variable nodes 706 (e.g., using 22(Z) bits associated with the systematic variable nodes 706). It should be understood that the bits associated with each of the systematic variable nodes 706 may represent the complete set of systematic bits of a codeword (e.g., the systematic bits 650 of the codeword 542). In some examples, the error detection operation may be a CRC check operation. For example, the receiver device 402 may perform a CRC check operation using 22(Z) bits associated with the systematic variable nodes 706.

For example, the receiver device 402 may perform the syndrome checking operation by determining whether the bits associated with the variable nodes 702 satisfies equation (1). That is, the receiver device 402 may multiply the parity check matrix (e.g., the parity check matrix 700) and a vector including the systematic bits and parity bits of a codeword (e.g., the systematic bits 650 and the parity bits 540 of the codeword 542) to obtain the syndrome s. If the obtained syndrome s is a zero vector, the receiver device may determine that the codeword includes no errors.

At 420, the receiver device 402 determines whether to operate an error correction decoder of the receiver device 402 (e.g., the error correction decoder circuit 910 in FIG. 9 or the LDPC decoder circuit 1010 in FIG. 10) based on a result of the error detection operation performed on the codeword 542 using the first set of bits and the second set of bits. For example, if the error detection operation is a CRC check operation, the receiver device 402 may determine to disable the error correction decoder if the result of the CRC check operation is a CRC pass. A CRC pass may indicate that the first set of bits and the second set of bits include no errors. The receiver device 402 may determine to operate the error correction decoder if the result of the CRC check operation is a CRC fail. A CRC fail may indicate that either the first set of bits or the second set of bits includes at least one error.

At 422, the receiver device 402 optionally operates the error correction decoder based on at least the first set of bits when the result of the error detection operation indicates at least one error. For example, if the error detection operation is a CRC check operation, the receiver device 402 may operate the error correction decoder if the result of the CRC check operation is a CRC fail. For example, the receiver device 402 may operate the error correction decoder using the first set of bits as inputs to the error correction decoder.

At 424, the receiver device 402 optionally disables the error correction decoder when the result of the error detection operation indicates no errors. For example, if the error detection operation is a CRC check operation, the receiver device 402 may determine to disable the error correction decoder if the result of the CRC check operation is a CRC pass. In some scenarios, if the receiver device 402 has already disabled the error correction decoder prior to the error detection operation (e.g., at 410 in response to a channel quality measurement being greater than or equal to a threshold), the receiver device 402 may refrain from enabling the error correction decoder.

The receiver device 402 can achieve power savings and/or a reduction of instruction cycles when the error correction decoder is disabled. For example, the error detection decoder (e.g., the error correction decoder circuit 910 in FIG. 9 or the LDPC decoder circuit 1010 in FIG. 10) may draw a substantially larger amount of current and for longer periods of time as compared to the current draw and operation time involved with the recovery of the second set of bits of the codeword (e.g., using the syndrome decoding operation or min-sum approximation operation described herein). Moreover, the combined number of instruction cycles associated with an exclusive OR operation and a CRC check per code block may be substantially less than the total number of instruction cycles required to perform error correction decoding with a minimum number of iterations (e.g., LDPC decoding iterations) per code block.

In some aspects, the receiver device 402 may transmit an acknowledgement (ACK) signal 426 if a result of an error detection operation performed on the codeword indicates no errors in the codeword. For example, the receiver device 402 may transmit the ACK signal 426 if a result of an error detection operation (e.g., a CRC checking operation, a syndrome checking operation) performed on the codeword using the first set of bits and the second set of bits indicates no errors.

FIG. 9 is a diagram 900 of the receiver device 402 in accordance with various aspects of the disclosure. The receiver device 402 includes a receiver circuit 902, a demapper circuit 904, a punctured bit recovery circuit 906, an error detection circuit 908, an error correction decoder circuit 910, a buffer circuit 912, a measurement circuit 914, and a control circuit 916.

The measurement circuit 914 may measure a first signal transmission 918 (e.g., from the transmitter device 404 described with reference to FIG. 4). For example, the first signal transmission 918 may include a reference signal (e.g., a CSI-RS or an SRS). In some examples, a measurement of the first signal transmission 918 at the measurement circuit 914 may be a channel quality measurement, such as a received signal strength value (e.g., an RSRP value), an SNR value, and/or an SINR value. In other examples, the measurement circuit 914 may measure the channel in terms of a quality of one or more LLRs. In some examples, the channel quality measurement at the measurement circuit 914 may be expressed as a combination of a received signal strength value, SNR value, SINR value, and/or a quality of one or more LLRs. In some examples, the first signal transmission 918 may be the first signal transmission 408 in FIG. 4.

The measurement circuit 914 may provide at least one channel quality measurement to the control circuit 916 via a measurement signal 920. The control circuit 916 may enable or disable the error correction decoder circuit 910 via a control signal 922 based on the at least one channel quality measurement and/or other measurement information in the measurement signal 920.

The receiver circuit 902 may receive a second signal transmission 924 carrying a codeword (e.g., the codeword 542 of FIG. 5) and may provide the second signal transmission 924 to the demapper circuit 904 via a signal 926. The demapper circuit 904 may demodulate the signal 926 and may generate soft-decision bits (e.g., LLR values) of the codeword. In some examples, the second signal transmission 924 may be the second signal transmission 412 in FIG. 4.

For example, the soft-decision bits may include a first set of bits of the codeword. In one example, the first set of bits may be unpunctured systematic bits and parity bits of the codeword. For example, with reference to FIG. 6, the first set of bits may include the unpunctured systematic bits 660 having a size 658 and the parity bits 540 of the codeword 542. In one example, the first set of bits may be unpunctured systematic bits and parity bits of the codeword. For example, with reference to FIG. 6, the first set of bits may include the unpunctured systematic bits 660 having a size 658 and the parity bits 540 of the codeword 542.

In some aspects, the demapper circuit 904 may provide the soft-decision bits to the measurement circuit 914 via a signal 928. The measurement circuit 914 may determine a quality of the soft-decision bits and may include the quality of the soft-decision bits in the measurement signal 920. In some examples, the control circuit 916 may enable or disable the error correction decoder circuit 910 via the control signal 922 based on the quality of the soft-decision bits in the measurement signal 920. In some examples, the error correction decoder circuit 910 may be an iterative error correction decoder, such as an LDPC decoder, or other type of error correction decoder, such as a polar code decoder.

In some scenarios, if some of the systematic bits of the codeword are punctured, the demapper circuit 904 may provide the first set of bits of the codeword to the punctured bit recovery circuit 906 via a signal 929. In some examples, the first set of bits of the codeword in the signal 929 may be soft-decision bits of the codeword. The punctured bit recovery circuit 906 may recover a second set of bits of the codeword based on at least the first set of bits. For example, the second set of bits may be punctured systematic bits of the codeword, such as the punctured systematic bits 653 of the codeword 542 shown in FIG. 6.

In some examples, the punctured bit recovery circuit 906 may recover the second set of bits of the codeword by first generating hard-decision bits (e.g., binary values) of the first set of bits of the codeword from the soft-decision bits (e.g., LLRs) of the codeword in the signal 929. The punctured bit recovery circuit 906 may then perform a syndrome decoding operation based on the first set of bits (e.g., hard-decision bits), a parity check matrix (also referred to as a parity matrix) associated with the codeword, and a syndrome defined as a zero vector. The punctured bit recovery circuit 906 may provide the first set of bits and the second set of bits of the codeword to the error detection circuit 908 via a signal 930.

In other examples, the punctured bit recovery circuit 906 may recover the second set of bits of the codeword by performing a minimum-sum decoding operation (also referred to as a min-sum approximation operation) based on at least the first set of bits and a parity check matrix associated with the codeword. The punctured bit recovery circuit 906 may provide the first set of bits and the second set of bits of the codeword to the error detection circuit 908 via the signal 930.

In some scenarios, if none of the systematic bits of the codeword are punctured, the demapper circuit 904 may provide all systematic bits of the codeword (e.g., as hard-decision bits) to the error detection circuit 908 via a signal 931. For example, if the codeword is a polar encoded codeword, none of the systematic bits of the polar encoded codeword may be punctured and, therefore, no recovery of punctured bits may be needed. In these scenarios, the systematic bits of the codeword may bypass the punctured bit recovery circuit 906.

The error detection circuit 908 may perform an error detection operation on the codeword. In one example, the error detection circuit 908 may receive the first set of bits and the second set of bits of the codeword via the signal 930 and may perform an error detection operation using the first set of bits and the second set of bits of the codeword. In another example, the error detection circuit 908 may receive all systematic bits of the codeword via the signal 931 and may perform an error detection operation on the codeword using all systematic bits of the codeword. In some examples, the error detection operation may include a syndrome checking operation, a CRC check operation, or a combination thereof. The error detection circuit 908 may provide a result of the error detection operation performed on the codeword to the control circuit 916 via a signal 932.

In one example scenario, the error detection circuit 908 may provide the systematic bits of the codeword (e.g., the first set of bits and the second set of bits of the codeword) to the buffer circuit 912 if the result of the error detection operation indicates that the systematic bits of the codeword (e.g., the first set of bits and the second set of bits of the codeword) includes no errors. It should be noted that the receiver device 402 may not operate the error correction decoder circuit 910 (e.g., the error correction decoder circuit 910 may be turned off) or may not use the error correction decoder circuit 910 if the systematic bits of the codeword (e.g., the first set of bits and the second set of bits of the codeword) include no errors. This may allow the receiver device 402 to achieve power savings and/or a reduction of instruction cycles.

For example, the error detection circuit 908 may perform a CRC check operation using the systematic bits of the codeword (e.g., the first set of bits and the second set of bits of the codeword). If the result of the CRC check operation is a CRC pass, the error detection circuit 908 may indicate to the control circuit 916 (e.g., via the signal 932) that the first set of bits and the second set of bits of the codeword include no errors. In response to the indication that the first set of bits and the second set of bits of the codeword include no errors, the control circuit 916 may disable the error correction decoder circuit 910 via the control signal 922. The error detection circuit 908 may provide the systematic bits of the codeword (e.g., the first set of bits and the second set of bits of the codeword) to the buffer circuit 912 via a signal 934.

In another example scenario, the error detection circuit 908 may provide the systematic bits of the codeword (e.g., the first set of bits and the second set of bits of the codeword) to the error correction decoder circuit 910 if the result of the error detection operation indicates that the systematic bits of the codeword includes at least one error. In some examples, the error detection circuit 908 may provide a signal 932 to the control circuit 916 indicating that the systematic bits of the codeword include at least one error.

In response to the signal 932 indicating that the systematic bits of the codeword include at least one error, the control circuit 916 may enable (e.g., power on) the error correction decoder circuit 910 via the control signal 922. The error detection circuit 908 may provide the systematic bits of the codeword (e.g., the first and second sets of bits of the codeword) to the error correction decoder circuit 910 via a signal 936. The error correction decoder circuit 910 may correct any errors in the systematic bits of the codeword (e.g., in the first set of bits or the second set of bits of the codeword) and may provide the systematic bits of the codeword to the buffer circuit 912 via a signal 938.

FIG. 10 is a diagram 1000 of the receiver device 402 in accordance with various aspects of the disclosure. The receiver device 402 includes a receiver circuit 1002, a demapper circuit 1004, an LDPC syndrome decoder circuit 1006, a CRC checking circuit 1008, an LDPC decoder circuit 1010, and a buffer circuit 1012.

The receiver circuit 1002 may receive a signal transmission 1014 carrying a codeword (e.g., the codeword 542) and may provide the signal transmission 1014 to the demapper circuit 1004 via a signal 1016. In some examples, the signal transmission may be the second signal transmission 412 described with reference to FIG. 4. The demapper circuit 1004 may demodulate the signal 1016 and may generate soft-decision bits (e.g., LLR values) 1018 of the codeword. For example, the soft-decision bits 1018 may include a first set of bits of the codeword. In one example, the first set of bits may be unpunctured systematic bits of a codeword. For example, with reference to FIG. 6, the first set of bits may include at least the unpunctured systematic bits 660 having a size 658 and the parity bits 540 of the codeword 542.

The LDPC syndrome decoder circuit 1006 may recover a second set of bits of the codeword based on at least the first set of bits. For example, the second set of bits may be punctured systematic bits of the codeword, such as the punctured systematic bits 653 of the codeword 542 shown in FIG. 6. In some examples, the LDPC syndrome decoder circuit 1006 may recover the second set of bits of the codeword by first generating hard-decision bits (e.g., binary values) of the first set of bits of the codeword from the soft-decision bits (e.g., LLR values) 1018. The LDPC syndrome decoder circuit 1006 may then perform a syndrome decoding operation based on the first set of bits (e.g., hard-decision bits), a parity check matrix (also referred to as a parity matrix) associated with the codeword, and a syndrome defined as a zero vector. The LDPC syndrome decoder circuit 1006 may provide the first set of bits and the second set of bits of the codeword to the error detection circuit 908 via a signal 930.

The CRC checking circuit 1008 may receive the first set of bits and the second set of bits of the codeword via a signal 1020 and may perform a CRC check on the codeword using the first set of bits and the second set of bits. In one example scenario, the CRC checking circuit 1008 may provide the first set of bits and the second set of bits of the codeword to the buffer circuit 1012 via a signal 1026 if the result of the CRC check indicates that the first set of bits and the second set bits of the codeword include no errors (e.g., if the result of the CRC check is a CRC pass). It should be noted that the receiver device 402 may not operate the LDPC decoder circuit 1010 (e.g., the LDPC decoder circuit 1010 may be turned off) or may not use the LDPC decoder circuit 1010 if the first set of bits and the second set of bits of the codeword include no errors. This may allow the receiver device 402 to achieve power savings and/or a reduction of instruction cycles.

In another example scenario, the CRC checking circuit 1008 may provide the first set of bits and the second set of bits of the codeword to the LDPC decoder circuit 1010 via a signal 1022 if the result of the CRC check indicates that the first set of bits or the second set of bits of the codeword includes at least one error (e.g., if the result of the CRC check is a CRC fail). In response to the indication that the first set of bits or the second set of bits of the codeword includes at least one error, the receiver device 402 may enable (e.g., power on) the LDPC decoder circuit 1010 and the CRC checking circuit 1008 may provide the first set of bits and the second set of bits of the codeword to the LDPC decoder circuit 1010 via the signal 1022. The LDPC decoder circuit 1010 may correct any errors in the first set of bits and the second set of bits of the codeword and may provide the first set of bits and the second set of bits of the codeword to the buffer circuit 1012 via a signal 1024.

Figure 11:
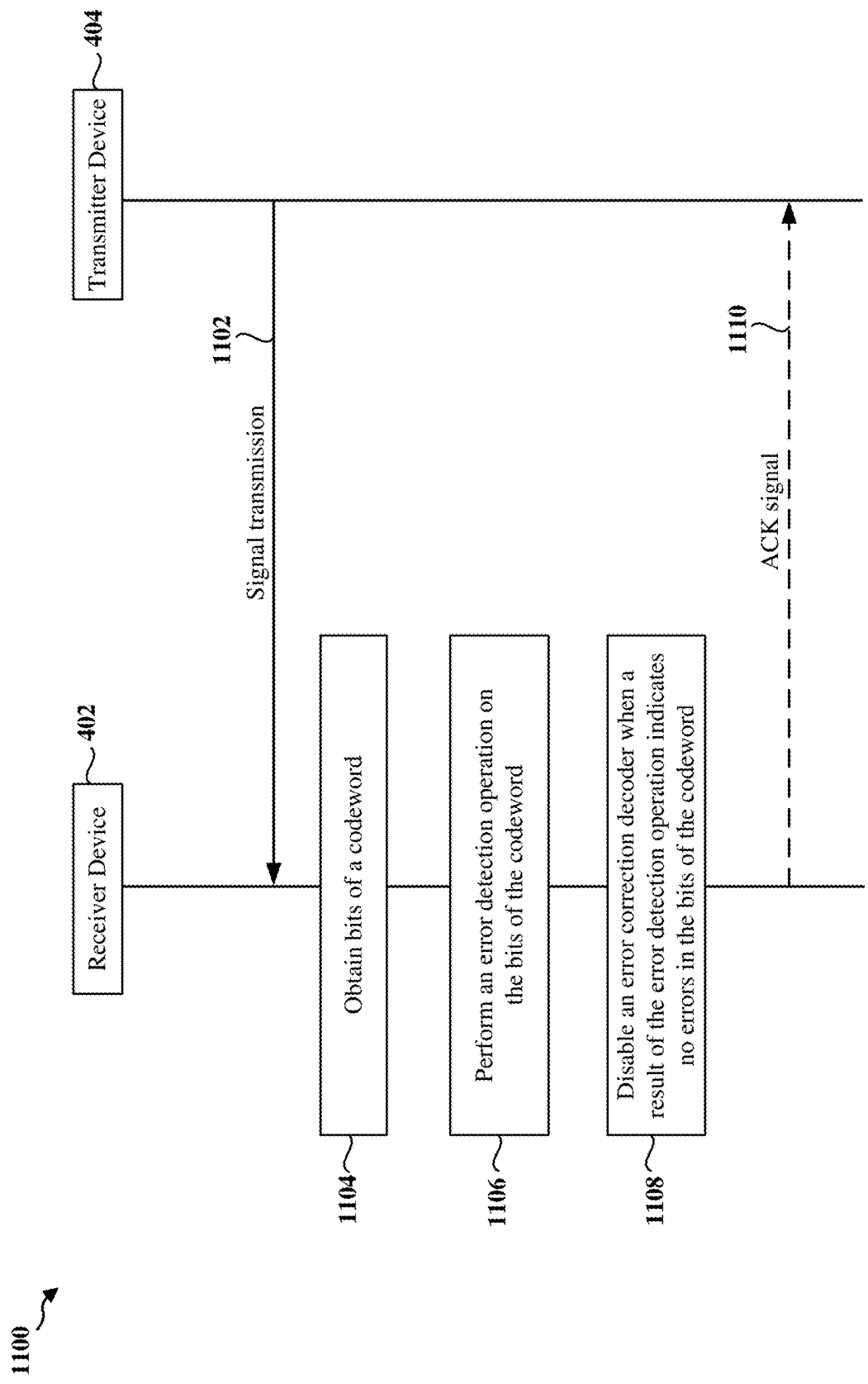
FIG. 11 illustrates a signal flow diagram in accordance with various aspects of the disclosure.

FIG. 11 illustrates a signal flow diagram 1100 in accordance with various aspects of the disclosure. The signal flow diagram 1100 includes the receiver device 402 and the transmitter device 404.

The transmitter device 404 may transmit a signal transmission 1102 carrying a codeword, such as the codeword 542. In some examples, the codeword in the signal transmission 1102 may be the codeword 542 described with reference to FIG. 5. In other examples, the codeword in the signal transmission 1102 may be a polar encoded codeword. In some examples, the transmitter device 404 may not puncture any bits of the codeword in the signal transmission 1102.

At 1104, the receiver device 402 obtains bits of the codeword included in the signal transmission 1102. In one example, the bits of the codeword may include all systematic bits of a channel encoded code block (e.g., a codeword).

In some examples, the receiver device 402 may obtain the bits of the codeword by demodulating the signal transmission 1102 carrying the codeword to generate soft-decision values. For example, the soft-decision values may be in the form of LLR values. The receiver device 402 may then use the soft-decision values to determine hard-decision bits (e.g., binary values) of the codeword.

At 1106, the receiver device 1106 performs an error detection operation on the bits of the codeword. In some examples, the error detection operation may include a syndrome checking operation, a CRC check operation (also referred to as a CRC check or a CRC), or a combination thereof.

For example, the receiver device 402 may perform an error detection operation using the bits associated with each of the systematic variable nodes 706 (e.g., using 22(Z) bits associated with the systematic variable nodes 706). It should be understood that the bits associated with each of the systematic variable nodes 706 may represent the complete set of systematic bits of a codeword. In some examples, the error detection operation may be a CRC check operation. For example, the receiver device 402 may perform a CRC check operation using 22(Z) bits associated with the systematic variable nodes 706.

For example, the receiver device 402 may perform the syndrome checking operation by determining whether the bits associated with the variable nodes 702 satisfies equation (1). That is, the receiver device 402 may multiply the parity check matrix (e.g., the parity check matrix 700) and a vector including the systematic bits and parity bits of a codeword (e.g., the systematic bits 650 and the parity bits 540 of the codeword 542) to obtain the syndrome s. If the obtained syndrome s is a zero vector, the receiver device may determine that the codeword includes no errors.

At 1108, the receiver device 402 disables an error correction decoder (e.g., the error correction decoder circuit 910) when a result of the error detection operation indicates no errors in the bits of the codeword. For example, if the error detection operation is a CRC check operation, the receiver device 402 may disable the error correction decoder when the result of the CRC check operation is a CRC pass.

In some aspects, the receiver device 402 may transmit an ACK signal 1110 if a result of an error detection operation performed on the codeword indicates no errors. For example, the receiver device 402 may transmit the ACK signal 1110 if a result of an error detection operation (e.g., a CRC checking operation, a syndrome checking operation) performed on the bits of the codeword indicates no errors in the bits of the codeword.

Figure 12:
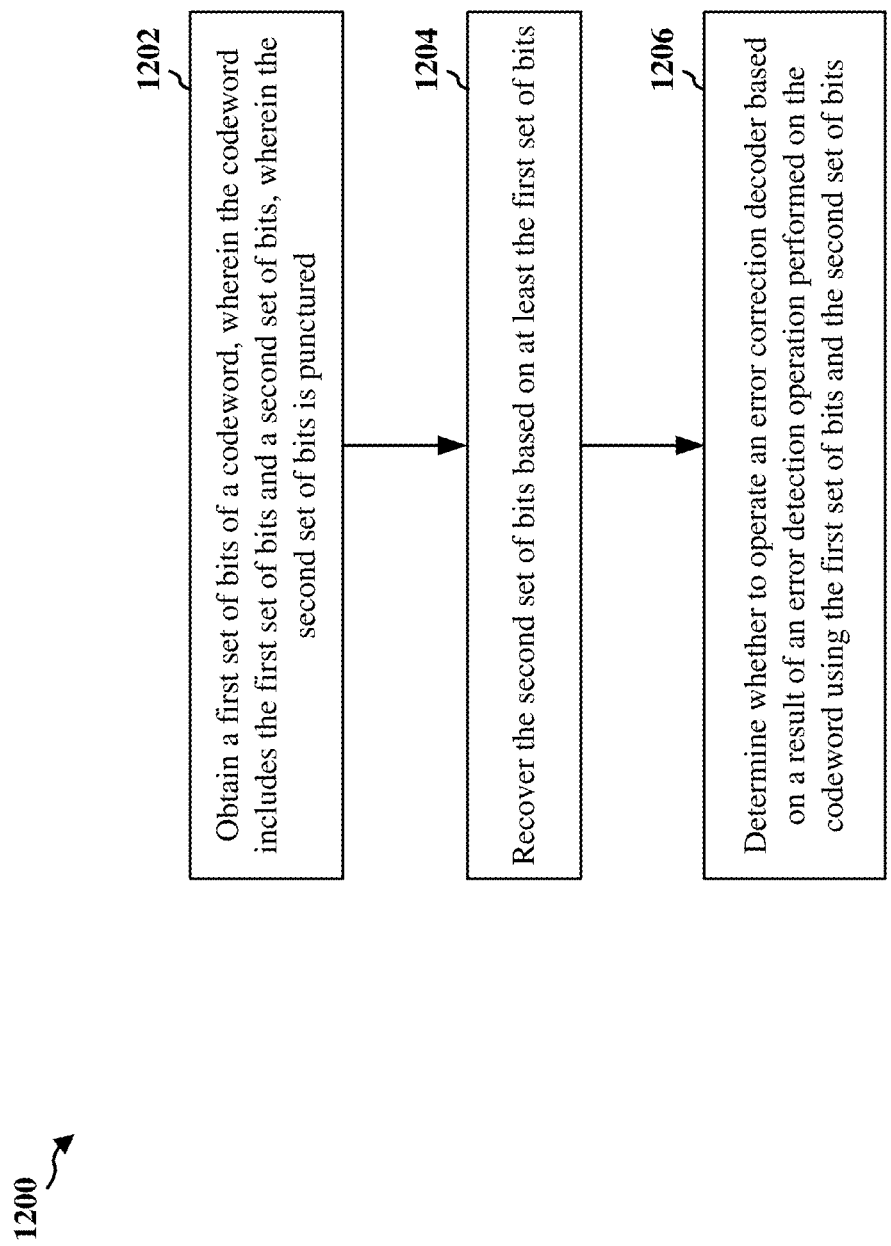
FIG. 12 is a flowchart of a method of wireless communication.

FIG. 12 is a flowchart 1200 of a method of wireless communication. The method may be performed by a receiver device (e.g., the receiver device 402; the apparatus 1502/1502'; the processing system 1614). In some aspects, if the receiver device is implemented as a UE, the processing system 1614 may include the memory 360 and may be the entire receiver device 402 or a component of the receiver device 402, such as the TX processor 368, the RX processor 356, and/or the controller/processor 359. In some aspects, if the receiver device is implemented as a base station, the processing system 1614 may include the memory 376 and may be the entire receiver device 402 or a component of the receiver device 402, such as the TX processor 316, the RX processor 370, and/or the controller/processor 375.

At 1202, the receiver device obtains a first set of bits of a codeword, wherein the codeword includes the first set of bits and a second set of bits, wherein the second set of bits is punctured. In some examples, with reference to FIG. 4, the receiver device 402 may obtain the first set of bits of the codeword included in the second signal transmission 412. In one example, the first set of bits may be the unpunctured systematic bits of a channel encoded code block (e.g., a codeword). For example, with reference to FIG. 6, the first set of bits may include at least the unpunctured systematic bits 660 having a size 658 of the codeword 542.

In some aspects, the receiver device obtains the first set of bits of the codeword by receiving a plurality of log likelihood ratios (LLRs) and determining the first set of bits based on the plurality of LLRs. For example, the receiver device may determine the first set of bits by generating hard-decision bits from the plurality of LLRs.

At 1204, the receiver device recovers the second set of bits based on at least the first set of bits. In some aspects, the receiver device performs a syndrome decoding operation based on the first set of bits, a parity check matrix associated with the codeword, and a syndrome defined as a zero vector to recover the second set of bits. In some examples, the syndrome decoding operation includes an exclusive OR operation between two or more subsets of bits in the first set of bits, wherein each of the two or more subsets of bits corresponds to a different variable node of a same check node in the parity check matrix.

For example, with reference to FIG. 7C, the receiver device 402 may select a check node in the parity check matrix 700 that includes a systematic variable node having punctured systematic bits and an entry in the parity check matrix 700 set to "1" for that systematic variable node. In one example, the receiver device 402 may select the second check node 717 that includes the systematic variable nodes 718 and the parity variable nodes 720. The first systematic variable node 710 of the second check node 717 includes punctured systematic bits and an entry 722 in the parity check matrix 700 set to "1".

The receiver device 402 may perform an exclusive OR operation (also referred to as an XOR operation) between each set of Z bits associated with the systematic variable nodes 718 and the parity variable nodes 708 having an entry set to "1" at the second check node 717. Therefore, in the example of FIG. 7C, the receiver device 402 may perform an exclusive OR operation between the Z bits of the variable nodes 3, 4, 5, 6, 8, 9, 10, 12, 13, 15, 16, 17, 18, 20, 22, 23, 24, 25. The exclusive OR operation between the Z bits of the variable nodes 3, 4, 5, 6, 8, 9, 10, 12, 13, 15, 16, 17, 18, 20, 22, 23, 24, 25 may be performed in a bitwise manner.

The result of the exclusive OR operation between each set of Z bits associated with the systematic variable nodes 718 and the parity variable nodes 708 having an entry set to "1" at the second check node 717 may represent Z bits (e.g., Z punctured systematic bits) associated with the first systematic variable node 710. Therefore, the receiver device 402 may recover the punctured systematic bits associated with the first systematic variable node 710 by performing the exclusive OR operation between the Z bits of the variable nodes 3, 4, 5, 6, 8, 9, 10, 12, 13, 15, 16, 17, 18, 20, 22, 23, 24, 25.

With reference to FIG. 7D, the receiver device 402 may select the first check node 723 that includes the systematic variable nodes 724 and the parity variable nodes 726. The second systematic variable node 712 of the first check node 723 includes punctured systematic bits and an entry 728 in the parity check matrix 700 set to "1".

The receiver device 402 may perform an exclusive OR operation between each set of Z bits associated with the systematic variable nodes 724 and parity variable nodes 726 having an entry set to "1" at the first check node 723. Therefore, in the example of FIG. 7D, the receiver device 402 may perform an exclusive OR operation between the Z bits of the variable nodes 1, 3, 4, 6, 7, 10, 11, 12, 13, 14, 16, 17, 19, 20, 21, 22, 23, 24. The exclusive OR operation between the Z bits of the variable nodes 1, 3, 4, 6, 7, 10, 11, 12, 13, 14, 16, 17, 19, 20, 21, 22, 23, 24 may be performed in a bitwise manner.

The result of the exclusive OR operation between each set of Z bits associated with the systematic variable nodes 724 and parity variable nodes 726 having an entry set to "1" at the first check node 723 may represent Z bits (e.g., Z punctured systematic bits) associated with the second systematic variable node 712. Therefore, in the example of FIG. 7D, the receiver device 402 may recover the punctured systematic bits associated with the second systematic variable node 712 by performing an exclusive OR operation between the Z bits of the variable nodes 1, 3, 4, 6, 7, 10, 11, 12, 13, 14, 16, 17, 19, 20, 21, 22, 23, 24.

In other aspects, the receiver device performs a minimum-sum decoding operation based on the first set of bits and a parity check matrix associated with the codeword to recover the second set of bits. For example, the receiver device 402 may recover the second set of bits of the codeword 542 by performing a minimum-sum decoding operation based on at least the first set of bits and a parity check matrix associated with the codeword 542. For example, the receiver device 402 may perform the minimum-sum decoding operation by performing a check-node update operation using soft-decision bit values associated with one or more of the systematic variable nodes 706 and parity variable nodes 708.

For example, the receiver device 402 may determine extrinsic values (e.g., LLRs) of the first systematic variable node 710 of the second check node 717 using equation (2) and extrinsic values of the second systematic variable node 712 of the first check node 723 using equation (1). The receiver device may determine hard-decision values from LLR values (e.g., C1, C2) to recover the punctured systematic bits associated with the first and second systematic variable nodes 710, 712.

In some aspects, the receiver device determines the second set of bits based on the first set of bits without performing an error correction operation when a channel quality measurement is greater than or equal to a threshold. For example, the channel quality measurement includes at least one of a received signal strength value, an SNR value, an SINR value, a quality of one or more LLRs, or a combination thereof. In some aspects, the first set of bits includes at least a first information bit and at least one parity bit, and the second set of bits includes at least a second information bit.

Finally, at 1206, the receiver device determines whether to operate an error correction decoder based on a result of an error detection operation performed on the codeword using the first set of bits and the second set of bits. For example, if the error detection operation is a CRC check operation, the receiver device 402 may determine to disable the error correction decoder if the result of the CRC check operation is a CRC pass. A CRC pass may indicate that the first set of bits and the second set of bits include no errors. The receiver device 402 may determine to operate the error correction decoder if the result of the CRC check operation is a CRC fail. A CRC fail may indicate that either the first set of bits or the second set of bits includes at least one error.

Figure 13A:
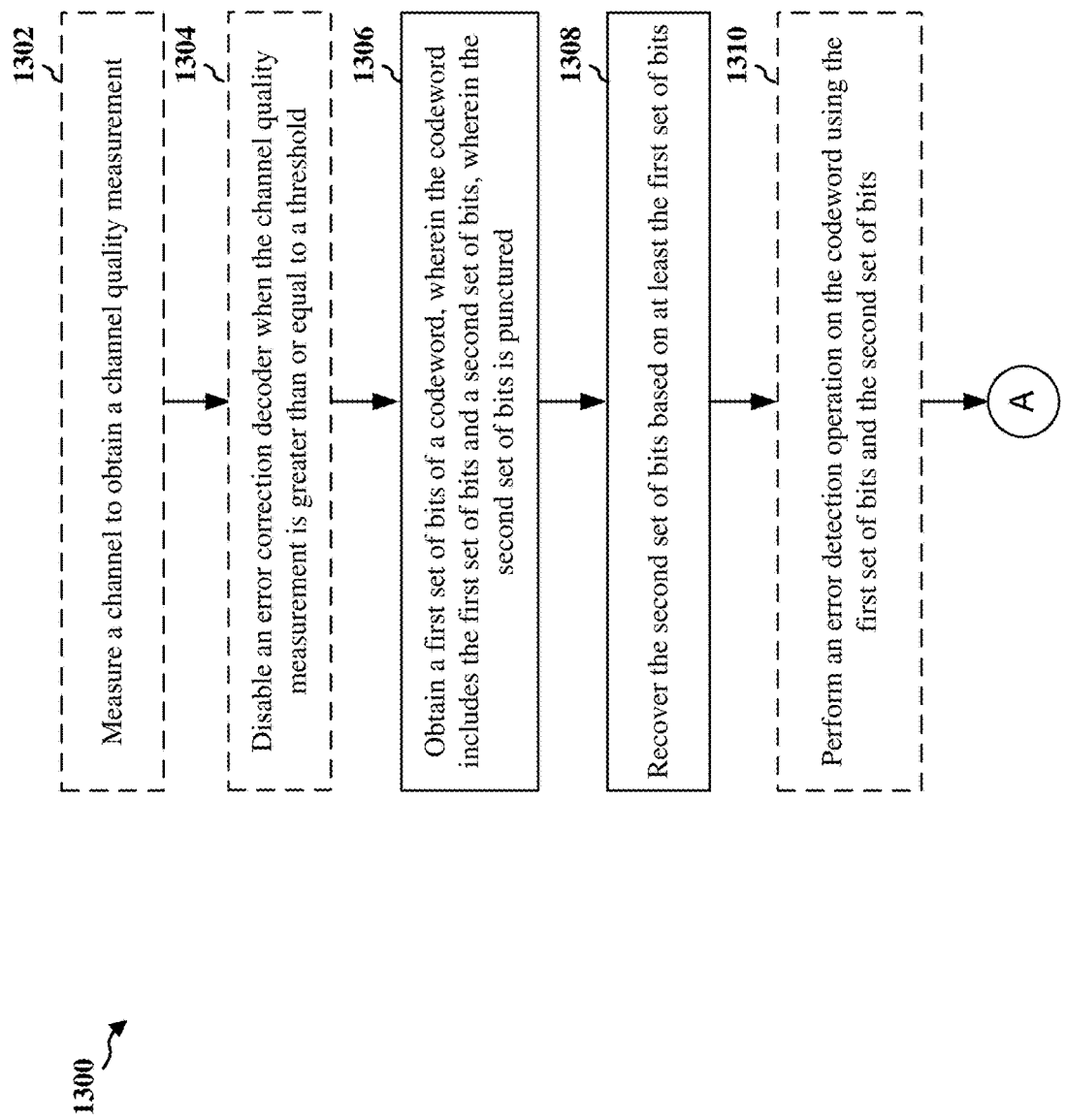
FIGS. 13A and 13B is a flowchart of a method of wireless communication.
Figure 13B:
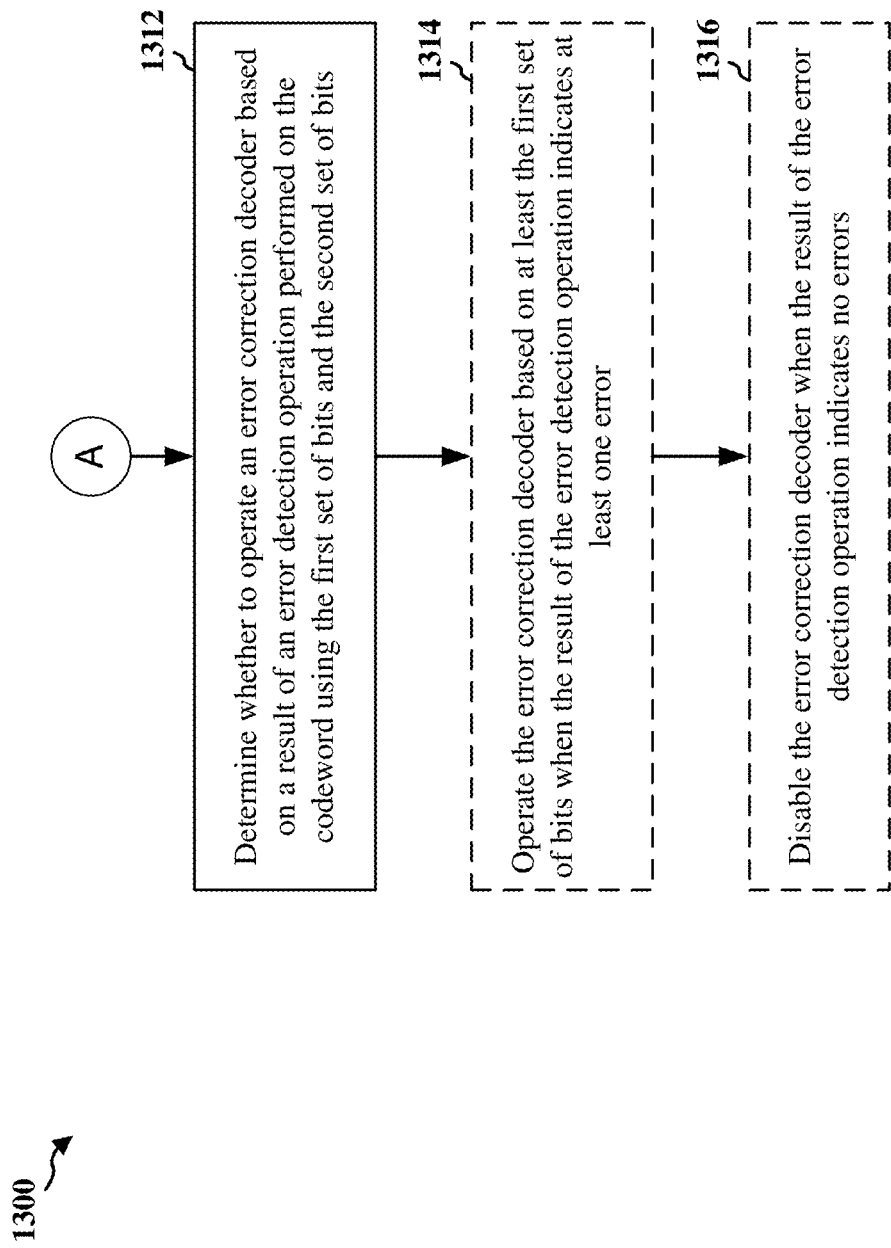

FIGS. 13A and 13B are a flowchart 1300 of a method of wireless communication. The method may be performed by a receiver device (e.g., the receiver device 402; the apparatus 1502/1502'; the processing system 1614). In some aspects, if the receiver device is implemented as a UE, the processing system 1614 may include the memory 360 and may be the entire receiver device 402 or a component of the receiver device 402, such as the TX processor 368, the RX processor 356, and/or the controller/processor 359. In some aspects, if the receiver device is implemented as a base station, the processing system 1614 may include the memory 376 and may be the entire receiver device 402 or a component of the receiver device 402, such as the TX processor 316, the RX processor 370, and/or the controller/processor 375. In FIGS. 13A and 13B, blocks indicated with dashed lines represent optional operations.

With reference to FIG. 13A, at 1302, the receiver device measures a channel to obtain a channel quality measurement. For example, the receiver device 402 may measure a channel by measuring a signal transmission, such as the first signal transmission 408 described with reference to FIG. 4. In some examples, a measurement of the first signal transmission 408 may be a channel quality measurement, such as a received signal strength value (e.g., a reference signal received power (RSRP) value), an SNR value, and/or an SINR value. In other examples, the receiver device may measure the channel in terms of a quality of one or more LLRs. In some examples, the channel quality measurement may be expressed as a combination of a received signal strength value, SNR value, SINR value, and/or a quality of one or more LLRs.

At 1304, the receiver device disables an error correction decoder when the channel quality measurement is greater than or equal to a threshold. In some examples, the receiver device may compare the channel quality measurement to a threshold (e.g., a threshold channel quality measurement value) and may determine whether the channel quality measurement is greater than or equal to the threshold. If the channel quality measurement is greater than or equal to the threshold, the receiver device may disable the error correction decoder of the receiver device by powering off the error correction decoder, powering off one or more hardware components associated with the error correction decoder, avoiding usage of the error correction decoder, and/or or preventing operation of the error correction decoder. Such disabling of the error correction decoder may reduce power consumption at the receiver device 402, thereby resulting in power savings.

At 1306, the receiver device obtains a first set of bits of a codeword, wherein the codeword includes the first set of bits and a second set of bits, wherein the second set of bits is punctured. In some examples, with reference to FIG. 4, the receiver device 402 may obtain the first set of bits of the codeword included in the second signal transmission 412. In one example, the first set of bits may be the unpunctured systematic bits of a channel encoded code block (e.g., a codeword). For example, with reference to FIG. 6, the first set of bits may include at least the unpunctured systematic bits 660 having a size 658 of the codeword 542.

In some aspects, the receiver device obtains the first set of bits of the codeword by receiving a plurality of log likelihood ratios (LLRs) and determining the first set of bits based on the plurality of LLRs. For example, the receiver device may determine the first set of bits by generating hard-decision bits from the plurality of LLRs.

At 1308, the receiver device recovers the second set of bits based on at least the first set of bits. In some aspects, the receiver device performs a syndrome decoding operation based on the first set of bits, a parity check matrix associated with the codeword, and a syndrome defined as a zero vector to recover the second set of bits. In some examples, the syndrome decoding operation includes an exclusive OR operation between two or more subsets of bits in the first set of bits, wherein each of the two or more subsets of bits corresponds to a different variable node of a same check node in the parity check matrix.

For example, with reference to FIG. 7C, the receiver device 402 may select a check node in the parity check matrix 700 that includes a systematic variable node having punctured systematic bits and an entry in the parity check matrix 700 set to "1" for that systematic variable node. In one example, the receiver device 402 may select the second check node 717 that includes the systematic variable nodes 718 and the parity variable nodes 720. The first systematic variable node 710 of the second check node 717 includes punctured systematic bits and an entry 722 in the parity check matrix 700 set to "1".

The receiver device 402 may perform an exclusive OR operation (also referred to as an XOR operation) between each set of Z bits associated with the systematic variable nodes 718 and the parity variable nodes 708 having an entry set to "1" at the second check node 717. Therefore, in the example of FIG. 7C, the receiver device 402 may perform an exclusive OR operation between the Z bits of the variable nodes 3, 4, 5, 6, 8, 9, 10, 12, 13, 15, 16, 17, 18, 20, 22, 23, 24, 25. The exclusive OR operation between the Z bits of the variable nodes 3, 4, 5, 6, 8, 9, 10, 12, 13, 15, 16, 17, 18, 20, 22, 23, 24, 25 may be performed in a bitwise manner.

The result of the exclusive OR operation between each set of Z bits associated with the systematic variable nodes 718 and the parity variable nodes 708 having an entry set to "1" at the second check node 717 may represent Z bits (e.g., Z punctured systematic bits) associated with the first systematic variable node 710. Therefore, the receiver device 402 may recover the punctured systematic bits associated with the first systematic variable node 710 by performing the exclusive OR operation between the Z bits of the variable nodes 3, 4, 5, 6, 8, 9, 10, 12, 13, 15, 16, 17, 18, 20, 22, 23, 24, 25.

With reference to FIG. 7D, the receiver device 402 may select the first check node 723 that includes the systematic variable nodes 724 and the parity variable nodes 726. The second systematic variable node 712 of the first check node 723 includes punctured systematic bits and an entry 728 in the parity check matrix 700 set to "1".

The receiver device 402 may perform an exclusive OR operation between each set of Z bits associated with the systematic variable nodes 724 and parity variable nodes 726 having an entry set to "1" at the first check node 723. Therefore, in the example of FIG. 7D, the receiver device 402 may perform an exclusive OR operation between the Z bits of the variable nodes 1, 3, 4, 6, 7, 10, 11, 12, 13, 14, 16, 17, 19, 20, 21, 22, 23, 24. The exclusive OR operation between the Z bits of the variable nodes 1, 3, 4, 6, 7, 10, 11, 12, 13, 14, 16, 17, 19, 20, 21, 22, 23, 24 may be performed in a bitwise manner.

The result of the exclusive OR operation between each set of Z bits associated with the systematic variable nodes 724 and parity variable nodes 726 having an entry set to "1" at the first check node 723 may represent Z bits (e.g., Z punctured systematic bits) associated with the second systematic variable node 712. Therefore, in the example of FIG. 7D, the receiver device 402 may recover the punctured systematic bits associated with the second systematic variable node 712 by performing an exclusive OR operation between the Z bits of the variable nodes 1, 3, 4, 6, 7, 10, 11, 12, 13, 14, 16, 17, 19, 20, 21, 22, 23, 24.

In other aspects, the receiver device performs a minimum-sum decoding operation based on the first set of bits and a parity check matrix associated with the codeword to recover the second set of bits. For example, the receiver device 402 may recover the second set of bits of the codeword 542 by performing a minimum-sum decoding operation based on at least the first set of bits and a parity check matrix associated with the codeword 542. For example, the receiver device 402 may perform the minimum-sum decoding operation by performing a check-node update operation using soft-decision bit values associated with one or more of the systematic variable nodes 706 and parity variable nodes 708.

For example, the receiver device 402 may determine extrinsic values (e.g., LLRs) of the first systematic variable node 710 of the second check node 717 using equation (2) and extrinsic values of the second systematic variable node 712 of the first check node 723 using equation (1). The receiver device may determine hard-decision values from LLR values (e.g., C1, C2) to recover the punctured systematic bits associated with the first and second systematic variable nodes 710, 712.

In some aspects, the receiver device determines the second set of bits based on the first set of bits without performing an error correction operation when a channel quality measurement is greater than or equal to a threshold. For example, the channel quality measurement includes at least one of a received signal strength value, an SNR value, an SINR value, a quality of one or more LLRs, or a combination thereof. In some aspects, the first set of bits includes at least a first information bit and at least one parity bit, and the second set of bits includes at least a second information bit.

At 1310, the receiver device performs an error detection operation on the codeword using the first set of bits and the second set of bits. In some examples, the error detection operation includes at least one of a syndrome checking operation, a CRC, or a combination thereof. For example, with reference to FIG. 4, the receiver device 402 may perform a CRC check operation using the bits associated with each of the systematic variable nodes 706 (e.g., using 22(Z) bits associated with the systematic variable nodes 706).

In some examples, the receiver device may perform the syndrome checking operation by determining whether the bits associated with the variable nodes 702 satisfies equation (1). That is, the receiver device 402 may multiply the parity check matrix (e.g., the parity check matrix 700) and a vector including the systematic bits and parity bits of a codeword (e.g., the systematic bits 650 and the parity bits 540 of the codeword 542) to obtain the syndrome s. If the obtained syndrome s is a zero vector, the receiver device may determine that the codeword includes no errors.

With reference to FIG. 13B, at 1312, the receiver device determines whether to operate an error correction decoder based on a result of an error detection operation performed on the codeword using the first set of bits and the second set of bits. For example, if the error detection operation is a CRC check operation, the receiver device 402 may determine to disable the error correction decoder if the result of the CRC check operation is a CRC pass. A CRC pass may indicate that the first set of bits and the second set of bits include no errors. The receiver device 402 may determine to operate the error correction decoder if the result of the CRC check operation is a CRC fail. A CRC fail may indicate that either the first set of bits or the second set of bits includes at least one error.

At 1314, the receiver device operates the error correction decoder based on at least the first set of bits when the result of the error detection operation indicates at least one error. For example, if the error detection operation is a CRC check operation, the receiver device 402 may operate the error correction decoder if the result of the CRC check operation is a CRC fail. For example, the receiver device 402 may operate the error correction decoder using the first set of bits as inputs to the error correction decoder.

Finally, at 1316, the receiver device disables the error correction decoder when the result of the error detection operation indicates no errors. For example, if the error detection operation is a CRC check operation, the receiver device 402 may determine to disable the error correction decoder if the result of the CRC check operation is a CRC pass. In some scenarios, if the receiver device 402 has already disabled the error correction decoder prior to the error detection operation (e.g., at 410 in response to a channel quality measurement being greater than or equal to a threshold), the receiver device 402 may refrain from enabling the error correction decoder.

Figure 14:
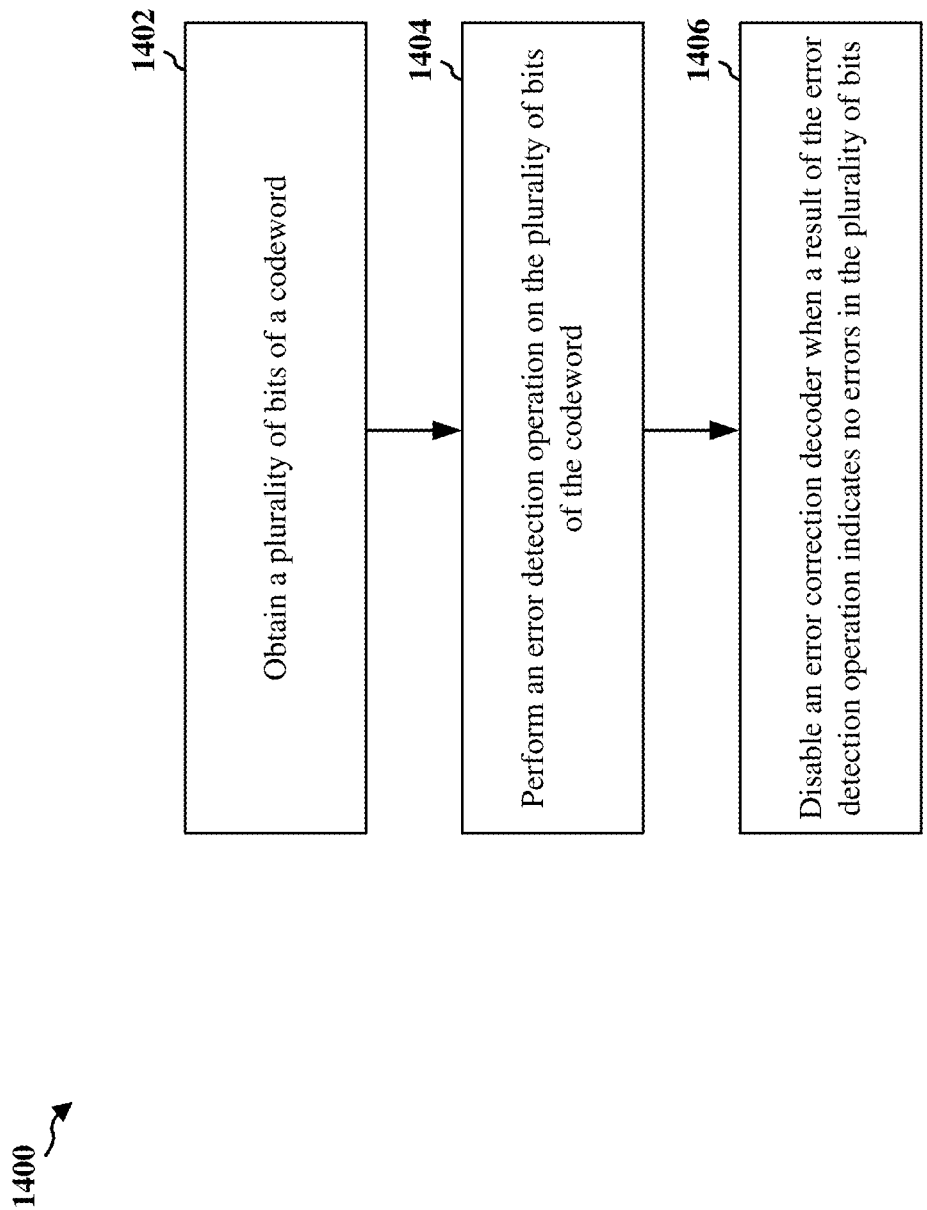
FIG. 14 is a flowchart of a method of wireless communication.

FIG. 14 is a flowchart 1400 of a method of wireless communication. The method may be performed by a receiver device (e.g., the receiver device 402; the apparatus 1502/1502'; the processing system 1614). In some aspects, if the receiver device is implemented as a UE, the processing system 1614 may include the memory 360 and may be the entire receiver device 402 or a component of the receiver device 402, such as the TX processor 368, the RX processor 356, and/or the controller/processor 359. In some aspects, if the receiver device is implemented as a base station, the processing system 1614 may include the memory 376 and may be the entire receiver device 402 or a component of the receiver device 402, such as the TX processor 316, the RX processor 370, and/or the controller/processor 375.

At 1402, the receiver device obtains a plurality of bits of a codeword. In some examples, the plurality of bits of the codeword includes at least a first information bit and at least one parity bit. In some examples, the receiver device obtains the plurality of bits of the codeword by receiving a plurality of LLRs and determining the plurality of bits of the codeword based on the plurality of LLRs. For example, with reference to FIG. 11, the receiver device 402 may obtain the bits of the codeword by demodulating the signal transmission 1102 carrying the codeword to generate soft-decision values. For example, the soft-decision values may be in the form of LLR values. The receiver device 402 may then use the soft-decision values to determine hard-decision bits (e.g., binary values) of the codeword.

At 1404, the receiver device performs an error detection operation on the plurality of bits of the codeword. In some examples, the error detection operation may include a syndrome checking operation, a CRC check operation (also referred to as a CRC check or a CRC), or a combination thereof. For example, with reference to FIG. 11, the receiver device 402 may perform an error detection operation using the bits associated with each of the systematic variable nodes 706 (e.g., using 22(Z) bits associated with the systematic variable nodes 706). In some examples, the error detection operation may be a CRC check operation. For example, the receiver device 402 may perform a CRC check operation using 22(Z) bits associated with the systematic variable nodes 706.

For example, with reference to FIG. 11, the receiver device 402 may perform the syndrome checking operation by determining whether the bits associated with the variable nodes 702 satisfies equation (1). That is, the receiver device 402 may multiply the parity check matrix (e.g., the parity check matrix 700) and a vector including the systematic bits and parity bits of a codeword (e.g., the systematic bits 650 and the parity bits 540 of the codeword 542) to obtain the syndrome s. If the obtained syndrome s is a zero vector, the receiver device may determine that the codeword includes no errors.

At 1406, the receiver device disables an error correction decoder when a result of the error detection operation indicates no errors in the plurality of bits. For example, if the error detection operation is a CRC check operation, the receiver device 402 may disable the error correction decoder when the result of the CRC check operation is a CRC pass.

Figure 15:
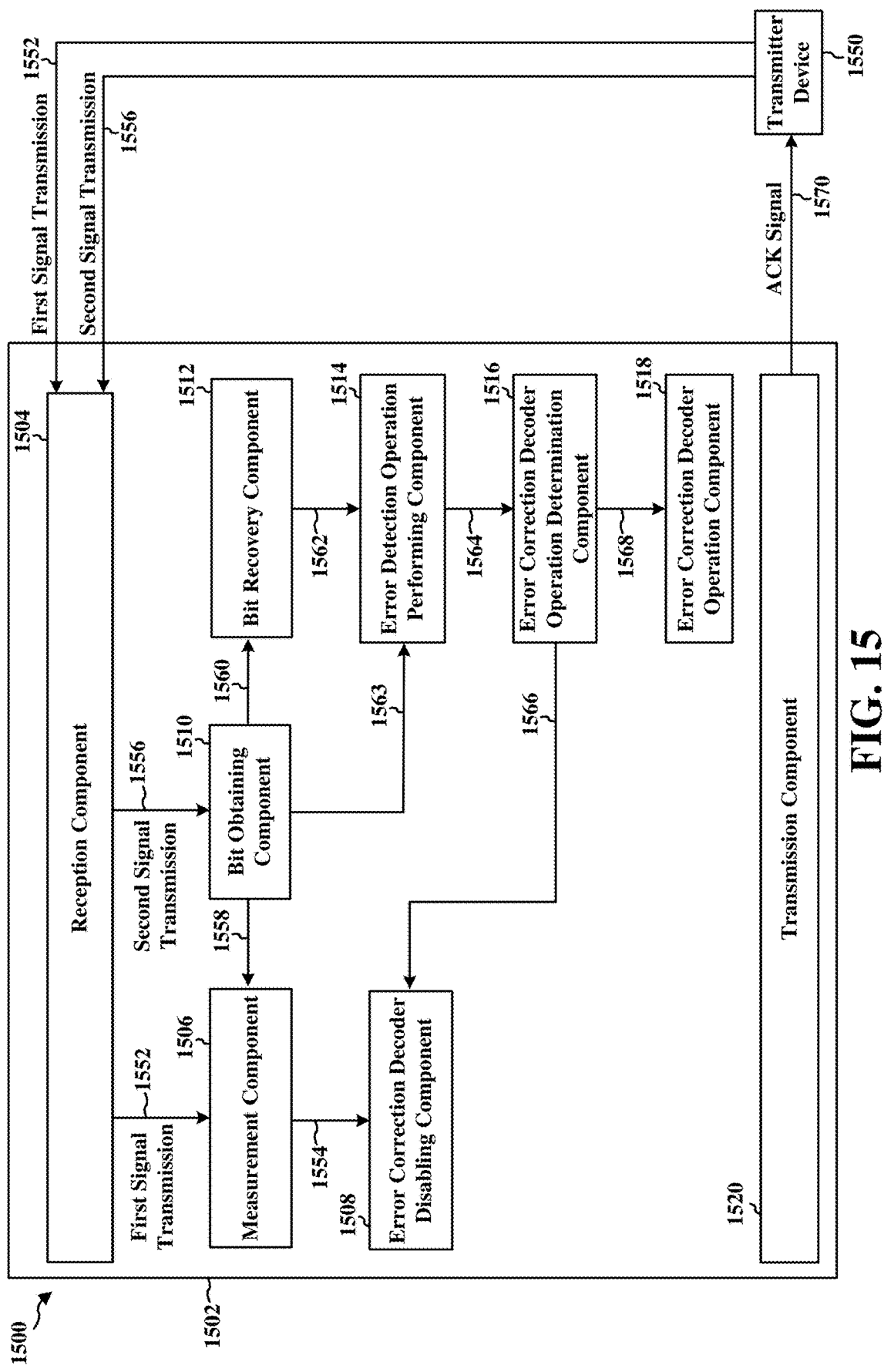
FIG. 15 is a conceptual data flow diagram illustrating the data flow between different means/components in an example apparatus.

FIG. 15 is a conceptual data flow diagram 1500 illustrating the data flow between different means/components in an example apparatus 1502. The apparatus may be a UE, a base station, or other type of receiver device. The apparatus includes a reception component 1504 that receives a first signal transmission 1552 and a second signal transmission 1556 from a transmitter device 1550.

The apparatus further includes a measurement component 1506 that receives the first signal transmission 1552 and measures a channel to obtain a channel quality measurement. In some examples, the channel quality measurement includes at least one of a received signal strength value, an SNR value, an SINR value, a quality of one or more LLRs, or a combination thereof. The measurement component 1506 provides the channel quality measurement to the error correction decoder disabling component 1508 via a signal 1554.

The apparatus further includes an error correction decoder disabling component 1508 that disables the error correction decoder when the result of the error detection operation indicates no errors and disables the error correction decoder when the channel quality measurement is greater than or equal to a threshold. The error correction decoder disabling component 1508 further disables the error correction decoder when a result of the error detection operation indicates no errors in the plurality of bits.

The apparatus further includes a bit obtaining component 1510 that receives the second signal transmission 1556 and obtains a first set of bits of a codeword (e.g., if one or more bits of the codeword are punctured) or obtains a plurality of bits of the codeword (e.g., if no bits of the codeword are punctured). In some examples, the codeword includes the first set of bits and a second set of bits, where the second set of bits is punctured. In some examples, the first set of bits includes at least a first information bit and at least one parity bit, and where the second set of bits includes at least a second information bit.

In some examples, the plurality of bits of the codeword includes at least a first information bit and at least one parity bit. In some aspects, the bit obtaining component 1510 may receive a plurality of LLRs and may determine the first set of bits based on the plurality of LLRs. The bit obtaining component 1510 may provide the plurality of LLRs to the measurement component 1506 via a signal 1558 and may provide the first set of bits of the codeword to the bit recovery component via a signal 1560.

The apparatus further includes a bit recovery component 1512 that recovers the second set of bits based on at least the first set of bits. In some aspects, the bit recovery component 1512 performs a syndrome decoding operation based on the first set of bits, a parity check matrix associated with the codeword, and a syndrome defined as a zero vector to recover the second set of bits. The syndrome decoding operation includes an exclusive OR operation between two or more subsets of bits in the first set of bits, wherein each of the two or more subsets of bits corresponds to a different variable node of a same check node in the parity check matrix.

In some aspects, the bit recovery component 1512 performs a minimum-sum decoding operation based on the first set of bits and a parity check matrix associated with the codeword. In some aspects, the bit recovery component 1512 determines the second set of bits based on the first set of bits without performing an error correction operation when a channel quality measurement is greater than or equal to a threshold.

The apparatus further includes an error detection operation performing component 1514 that receives the first set of bits and the second set of bits of the codeword from the bit recovery component 1512 via a signal 1562, or a plurality of bits of the codeword from the bit obtaining component 1510 via a signal 1563. In some aspects, the error detection operation performing component 1514 performs the error detection operation on the codeword using the first set of bits and the second set of bits, wherein the error detection operation includes at least one of a syndrome checking operation, a CRC, or a combination thereof. In some aspects, the error detection operation performing component 1514 performs an error detection operation on the plurality of bits of the codeword.

The apparatus further includes an error correction decoder operation determination component 1516 that receives a result of an error detection operation performed on the codeword via a signal 1564. The error correction decoder operation determination component 1516 determines whether to operate an error correction decoder based on a result of an error detection operation performed on the codeword using the first set of bits and the second set of bits or based on an error detection operation performed on the codeword using the plurality of bits of the codeword. In some examples, the error correction decoder operation determination component 1516 provides a signal 1566 for disabling the error correction decoder to the error correction decoder disabling component 1508 and provides a signal 1568 for operating the error correction decoder.

The apparatus further includes an error correction decoder operation component 1518 that receives the signal 1568 for operating the error correction decoder and operates the error correction decoder based on at least the first set of bits when the result of the error detection operation indicates at least one error.

The apparatus further includes a transmission component 1520 that transmits an ACK signal 1570 if the codeword includes no errors.

The apparatus may include additional components that perform each of the blocks of the algorithm in the aforementioned flowcharts of FIGS. 12, 13A, 13B, 14. As such, each block in the aforementioned flowcharts of FIGS. 12, 13A, 13B, 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
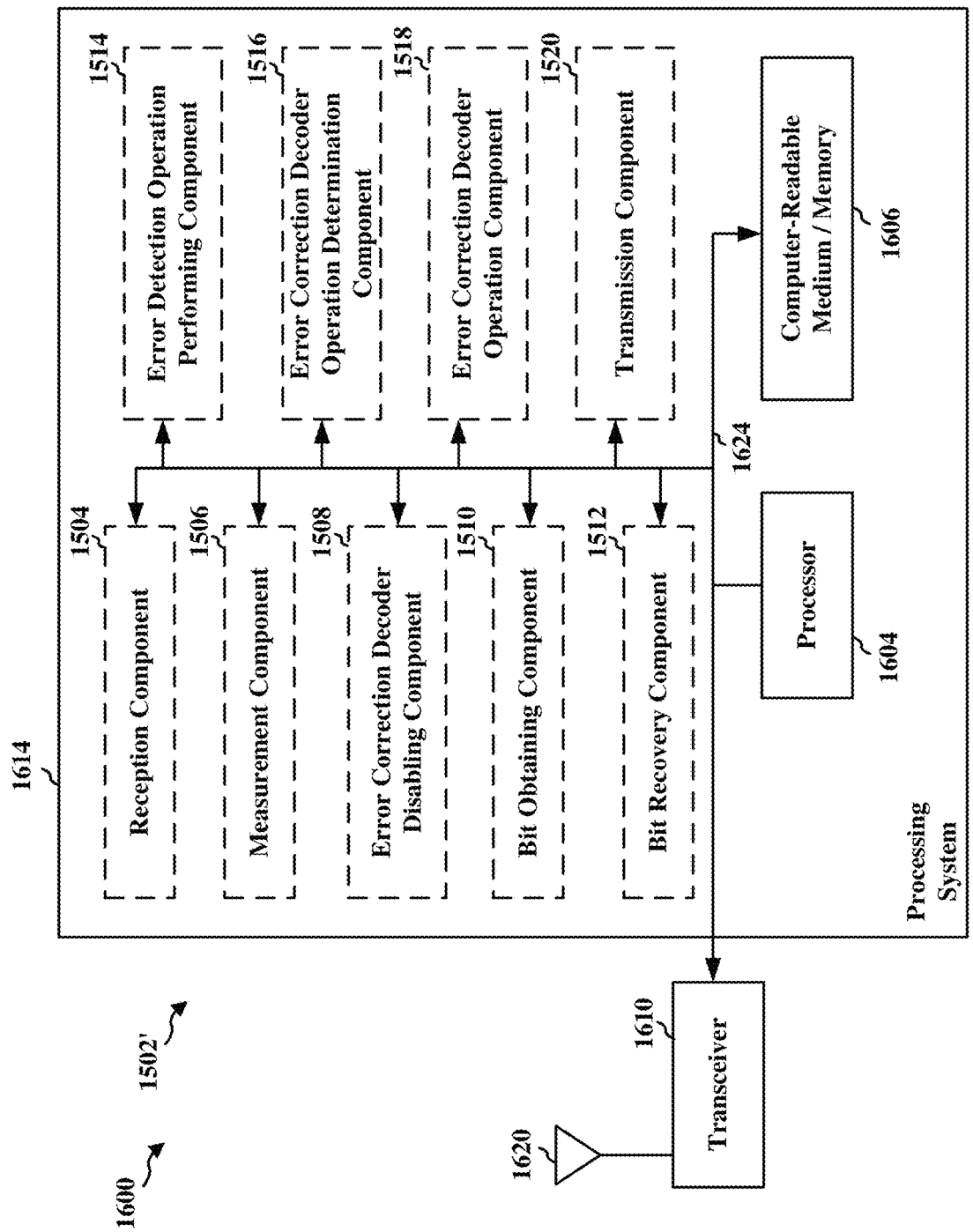
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, 1516, 1518, 1520, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1520, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514, 1516, 1518, 1520. The components may be software components running in the processor 1604, resident/stored in the computer readable medium/memory 1606, one or more hardware components coupled to the processor 1604, or some combination thereof.

In some aspects, the apparatus 1502' may be implemented as a base station (e.g., base station 310). In these aspects, the processing system 1614 may be a component of the base station 310 and may include the memory 376 and/or at least one of the TX processor 316, the RX processor 370, and the controller/processor 375. Alternatively, the processing system 1614 may be the entire base station (e.g., see 310 of FIG. 3).

In some aspects, the apparatus 1502' may be implemented as a UE (e.g., base station 350). In these aspects, the processing system 1614 may be a component of the UE 350 and may include the memory 360 and/or at least one of the TX processor 368, the RX processor 356, and the controller/processor 359.

Alternatively, the processing system 1614 may be the entire UE (e.g., see 350 of FIG. 3).

In one configuration, the apparatus 1502/1502' for wireless communication includes means for obtaining a first set of bits of a codeword, means for recovering a second set of bits based on at least the first set of bits, means for determining whether to operate an error correction decoder based on a result of an error detection operation performed on the codeword using the first set of bits and the second set of bits, means for operating the error correction decoder based on at least the first set of bits when the result of the error detection operation indicates at least one error, means for disabling the error correction decoder when the result of the error detection operation indicates no errors, means for performing the error detection operation on the codeword using the first set of bits and the second set of bits, means for measuring a channel to obtain a channel quality measurement, means for disabling the error correction decoder when the channel quality measurement is greater than or equal to a threshold, means for obtaining a plurality of bits of a codeword, means for performing an error detection operation on the plurality of bits of the codeword, and means for disabling an error correction decoder when a result of the error detection operation indicates no errors in the plurality of bits.

The aforementioned means may be one or more of the aforementioned components of the apparatus 1502 and/or the processing system 1614 of the apparatus 1502' configured to perform the functions recited by the aforementioned means. In some aspects, the apparatus 1502/1502' may be implemented as a UE. In these aspects, and as described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In some aspects, the apparatus 1502/1502' may be implemented as a base station. In these aspects, and as described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Therefore, the aspects described herein may enable the receiver device 402 to achieve power savings and/or a reduction of instruction cycles by recovering punctured systematic bits of a codeword (e.g., using the punctured bit recovery circuit 906 or the LDPC syndrome decoder circuit 1006) and disabling an error correction decoder (e.g., the error correction decoder circuit 910 or the LDPC decoder circuit 1010) if the systematic bits of the codeword include no errors. Moreover, the receiver device 402 may operate or use the error correction decoder in scenarios where at least one error is detected in the systematic bits of the codeword, which may enable correction of any errors in the systematic bits.

The following provides an overview of aspects of the present disclosure:

Aspect 1: An apparatus for wireless communication, comprising: a memory; and at least one processor coupled to the memory and configured to: obtain a first set of bits of a codeword, wherein the codeword includes the first set of bits and a second set of bits, wherein the second set of bits is punctured; recover the second set of bits based on at least the first set of bits; and determine whether to operate an error correction decoder based on a result of an error detection operation performed on the codeword using the first set of bits and the second set of bits.

Aspect 2: The apparatus of aspect 1, wherein the at least one processor configured to recover the second set of bits based on at least the first set of bits is further configured to: perform a syndrome decoding operation based on the first set of bits, a parity check matrix associated with the codeword, and a syndrome defined as a zero vector to recover the second set of bits.

Aspect 3: The apparatus of aspect 1 or 2, wherein the syndrome decoding operation includes an exclusive OR operation between two or more subsets of bits in the first set of bits, wherein each of the two or more subsets of bits corresponds to a different variable node of a same check node in the parity check matrix.

Aspect 4: The apparatus of any of aspects 1 through 3, wherein the at least one processor configured to recover the second set of bits based on at least the first set of bits is further configured to: perform a minimum-sum decoding operation based on the first set of bits and a parity check matrix associated with the codeword.

Aspect 5: The apparatus of any of aspects 1 through 4, wherein the at least one processor configured to recover the second set of bits based on at least the first set of bits is further configured to: determine the second set of bits based on the first set of bits without performing an error correction operation when a channel quality measurement is greater than or equal to a threshold.

Aspect 6: The apparatus of any of aspects 1 through 5, wherein the channel quality measurement includes at least one of a received signal strength value, a signal-to-noise ratio (SNR) value, a signal-to-interference plus noise ratio (SINR) value, a quality of one or more log likelihood ratios (LLRs), or a combination thereof.

Aspect 7: The apparatus of any of aspects 1 through 6, wherein the at least one processor is further configured to: operate the error correction decoder based on at least the first set of bits when the result of the error detection operation indicates at least one error.

Aspect 8: The apparatus of any of aspects 1 through 7, wherein the at least one processor is further configured to: disable the error correction decoder when the result of the error detection operation indicates no errors.

Aspect 9: The apparatus of any of aspects 1 through 8, wherein the first set of bits includes at least a first information bit and at least one parity bit, and wherein the second set of bits includes at least a second information bit.

Aspect 10: The apparatus of any of aspects 1 through 9, wherein the at least one processor is further configured to: perform the error detection operation on the codeword using the first set of bits and the second set of bits, wherein the error detection operation includes at least one of a syndrome checking operation, a cyclic redundancy check (CRC), or a combination thereof.

Aspect 11: The apparatus of any of aspects 1 through 10, wherein the at least one processor is further configured to: measure a channel to obtain a channel quality measurement; and disable the error correction decoder when the channel quality measurement is greater than or equal to a threshold.

Aspect 12: The apparatus of any of aspects 1 through 11, wherein the at least one processor configured to obtain the first set of bits of the codeword is further configured to: receive a plurality of log likelihood ratios (LLRs); and determine the first set of bits based on the plurality of LLRs.

Aspect 13: A method of wireless communication, comprising: obtaining a first set of bits of a codeword, wherein the codeword includes the first set of bits and a second set of bits, wherein the second set of bits is punctured; recovering the second set of bits based on at least the first set of bits; and determining whether to operate an error correction decoder based on a result of an error detection operation performed on the codeword using the first set of bits and the second set of bits.

Aspect 14: The method of aspect 13, wherein the recovering the second set of bits based on at least the first set of bits comprises: performing a syndrome decoding operation based on the first set of bits, a parity check matrix associated with the codeword, and a syndrome defined as a zero vector to recover the second set of bits.

Aspect 15: The method of aspect 13 or 14, wherein the syndrome decoding operation includes an exclusive OR operation between two or more subsets of bits in the first set of bits, wherein each of the two or more subsets of bits corresponds to a different variable node of a same check node in the parity check matrix.

Aspect 16: The method of any of aspects 13 through 15, wherein the recovering the second set of bits based on at least the first set of bits comprises: performing a minimum-sum decoding operation based on the first set of bits and a parity check matrix associated with the codeword.

Aspect 17: The method of any of aspects 13 through 16, wherein recovering the second set of bits based on at least the first set of bits comprises: determining the second set of bits based on the first set of bits without performing an error correction operation when a channel quality measurement is greater than or equal to a threshold.

Aspect 18: The method of any of aspects 13 through 17, wherein the channel quality measurement includes at least one of a received signal strength value, a signal-to-noise ratio (SNR) value, a signal-to-interference plus noise ratio (SINR) value, a quality of one or more log likelihood ratios (LLRs), or a combination thereof.

Aspect 19: The method of any of aspects 13 through 18, further comprising: operating the error correction decoder based on at least the first set of bits when the result of the error detection operation indicates at least one error.

Aspect 20: The method of any of aspects 13 through 19, further comprising: disabling the error correction decoder when the result of the error detection operation indicates no errors.

Aspect 21: The method of any of aspects 13 through 20, wherein the first set of bits includes at least a first information bit and at least one parity bit, and wherein the second set of bits includes at least a second information bit.

Aspect 22: The method of any of aspects 13 through 21, further comprising: performing the error detection operation on the codeword using the first set of bits and the second set of bits, wherein the error detection operation includes at least one of a syndrome checking operation, a cyclic redundancy check (CRC), or a combination thereof.

Aspect 23: The method of any of aspects 13 through 22, further comprising: measuring a channel to obtain a channel quality measurement; and disabling the error correction decoder when the channel quality measurement is greater than or equal to a threshold.

Aspect 24: The method of any of aspects 13 through 23, wherein the obtaining the first set of bits of the codeword comprises: receiving a plurality of log likelihood ratios (LLRs); and determining the first set of bits based on the plurality of LLRs.

Aspect 25: An apparatus for wireless communication, comprising: a memory; and at least one processor coupled to the memory and configured to: obtain a plurality of bits of a codeword; perform an error detection operation on the plurality of bits of the codeword; and disable an error correction decoder when a result of the error detection operation indicates no errors in the plurality of bits.

Aspect 26: The apparatus of aspect 25, wherein the plurality of bits of the codeword includes at least a first information bit and at least one parity bit.

Aspect 27: The apparatus of aspect 25 or 26, wherein the at least one processor configured to obtain the plurality of bits of the codeword is further configured to: receive a plurality of log likelihood ratios (LLRs); and determine the plurality of bits based on the plurality of LLRs.

Aspect 28: A method of wireless communication, comprising: obtaining a plurality of bits of a codeword; performing an error detection operation on the plurality of bits of the codeword; and disabling an error correction decoder when a result of the error detection operation indicates no errors in the plurality of bits.

Aspect 29: The method of aspect 28, wherein the plurality of bits of the codeword includes at least a first information bit and at least one parity bit.

Aspect 30: The method of aspect 28 or 29, wherein obtaining the plurality of bits of the codeword comprises: receiving a plurality of log likelihood ratios (LLRs); and determining the plurality of bits based on the plurality of LLRs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
a memory; and
at least one processor coupled to the memory and configured to:
obtain a first set of bits of a codeword, wherein the codeword includes the first set of bits and a second set of bits, wherein the second set of bits is punctured;
recover the second set of bits based on at least the first set of bits;
perform an error detection operation on the codeword using the first set of bits and the second set of bits; and
determine whether to enable an error correction decoder based on a result of the error detection operation performed on the codeword using the first set of bits and the second set of bits.

2. The apparatus of claim 1, wherein the at least one processor configured to recover the second set of bits based on at least the first set of bits is further configured to:
perform a syndrome decoding operation based on the first set of bits, a parity check matrix associated with the codeword, and a syndrome defined as a zero vector to recover the second set of bits.

3. The apparatus of claim 2, wherein the syndrome decoding operation includes an exclusive OR operation between two or more subsets of bits in the first set of bits, wherein each of the two or more subsets of bits corresponds to a different variable node of a same check node in the parity check matrix.

4. The apparatus of claim 1, wherein the at least one processor configured to recover the second set of bits based on at least the first set of bits is further configured to:
perform a minimum-sum decoding operation based on the first set of bits and a parity check matrix associated with the codeword.

5. The apparatus of claim 1, wherein the at least one processor configured to recover the second set of bits based on at least the first set of bits is further configured to:
determine the second set of bits based on the first set of bits without performing an error correction operation when a channel quality measurement is greater than or equal to a threshold.

6. The apparatus of claim 5, wherein the channel quality measurement includes at least one of a received signal strength value, a signal-to-noise ratio (SNR) value, a signal-to-interference plus noise ratio (SINR) value, a quality of one or more log likelihood ratios (LLRs), or a combination thereof.

7. The apparatus of claim 1, wherein the at least one processor is further configured to:
enable the error correction decoder based on at least the first set of bits when the result of the error detection operation indicates at least one error.

8. The apparatus of claim 1, wherein the at least one processor is further configured to:
disable the error correction decoder when the result of the error detection operation indicates no errors.

9. The apparatus of claim 1, wherein the first set of bits includes at least a first information bit and at least one parity bit, and wherein the second set of bits includes at least a second information bit.

10. The apparatus of claim 1, wherein the error detection operation includes at least one of a syndrome checking operation, a cyclic redundancy check (CRC), or a combination thereof.

11. The apparatus of claim 1, wherein the at least one processor is further configured to:
measure a channel to obtain a channel quality measurement; and
disable the error correction decoder when the channel quality measurement is greater than or equal to a threshold.

12. The apparatus of claim 1, wherein the at least one processor configured to obtain the first set of bits of the codeword is further configured to:
receive a plurality of log likelihood ratios (LLRs); and
determine the first set of bits based on the plurality of LLRs.

13. A method of wireless communication, comprising:
obtaining a first set of bits of a codeword, wherein the codeword includes the first set of bits and a second set of bits, wherein the second set of bits is punctured;
recovering the second set of bits based on at least the first set of bits;
performing an error detection operation on the codeword using the first set of bits and the second set of bits; and
determining whether to enable an error correction decoder based on a result of the error detection operation performed on the codeword using the first set of bits and the second set of bits.

14. The method of claim 13, wherein the recovering the second set of bits based on at least the first set of bits comprises:
performing a syndrome decoding operation based on the first set of bits, a parity check matrix associated with the codeword, and a syndrome defined as a zero vector to recover the second set of bits.

15. The method of claim 14, wherein the syndrome decoding operation includes an exclusive OR operation between two or more subsets of bits in the first set of bits, wherein each of the two or more subsets of bits corresponds to a different variable node of a same check node in the parity check matrix.

16. The method of claim 13, wherein the recovering the second set of bits based on at least the first set of bits comprises:
performing a minimum-sum decoding operation based on the first set of bits and a parity check matrix associated with the codeword.

17. The method of claim 13, wherein recovering the second set of bits based on at least the first set of bits comprises:
determining the second set of bits based on the first set of bits without performing an error correction operation when a channel quality measurement is greater than or equal to a threshold.

18. The method of claim 17, wherein the channel quality measurement includes at least one of a received signal strength value, a signal-to-noise ratio (SNR) value, a signal-to-interference plus noise ratio (SINR) value, a quality of one or more log likelihood ratios (LLRs), or a combination thereof.

19. The method of claim 13, further comprising:
enabling the error correction decoder based on at least the first set of bits when the result of the error detection operation indicates at least one error.

20. The method of claim 13, further comprising:
disabling the error correction decoder when the result of the error detection operation indicates no errors.

21. The method of claim 13, wherein the first set of bits includes at least a first information bit and at least one parity bit, and wherein the second set of bits includes at least a second information bit.

22. The method of claim 13, wherein the error detection operation includes at least one of a syndrome checking operation, a cyclic redundancy check (CRC), or a combination thereof.

23. The method of claim 13, further comprising:
measuring a channel to obtain a channel quality measurement; and
disabling the error correction decoder when the channel quality measurement is greater than or equal to a threshold.

24. The method of claim 13, wherein the obtaining the first set of bits of the codeword comprises:
receiving a plurality of log likelihood ratios (LLRs); and
determining the first set of bits based on the plurality of LLRs.

25. An apparatus for wireless communication, comprising:
a memory;
a bit obtaining circuit;
an error detection circuit;
an error correction decoder circuit; and at least one processor coupled to the memory, the bit obtaining circuit, the error detection circuit, and the error correction decoder circuit, the at least one processor configured to:
  obtain, via the bit obtaining circuit, a plurality of bits of a codeword;
  perform, via the error detection circuit, an error detection operation on the plurality of bits of the codeword; and
  refrain from powering on the error correction decoder circuit from a disabled state when a result of the error detection operation indicates no errors in the plurality of bits.

26. The apparatus of claim 25, wherein the plurality of bits of the codeword includes at least a first information bit and at least one parity bit.

27. The apparatus of claim 25, wherein the at least one processor configured to obtain the plurality of bits of the codeword is further configured to:
  receive a plurality of log likelihood ratios (LLRs); and
  obtain the plurality of bits based on the plurality of LLRs.

28. A method of wireless communication, comprising:
  obtaining, via a bit obtaining circuit, a plurality of bits of a codeword;
  performing, via an error detection circuit, an error detection operation on the plurality of bits of the codeword; and
  refraining from powering on an error correction decoder circuit from a disabled state when a result of the error detection operation indicates no errors in the plurality of bits.

29. The method of claim 28, wherein the plurality of bits of the codeword includes at least a first information bit and at least one parity bit.

30. The method of claim 28, wherein obtaining the plurality of bits of the codeword comprises:
  receiving a plurality of log likelihood ratios (LLRs); and
  obtaining the plurality of bits based on the plurality of LLRs.

* * * * *